US011157077B2

(12) United States Patent
Aleem et al.

(10) Patent No.: US 11,157,077 B2
(45) Date of Patent: Oct. 26, 2021

(54) METHOD AND SYSTEM FOR DUAL MODE EYE TRACKING ON WEARABLE HEADS-UP DISPLAY

(71) Applicant: GOOGLE LLC, Mountain View, CA (US)

(72) Inventors: Idris S. Aleem, Kitchener (CA); Andrew S. Logan, Waterloo (CA); Mayank Bhargava, Waterloo (CA)

(73) Assignee: GOOGLE LLC, Mountain View, CA (US)

(*) Notice: Subject to any disclaimer, the term of this patent is extended or adjusted under 35 U.S.C. 154(b) by 136 days.

(21) Appl. No.: 16/376,604

(22) Filed: Apr. 5, 2019

(65) Prior Publication Data
US 2019/0324532 A1  Oct. 24, 2019

Related U.S. Application Data

(60) Provisional application No. 62/658,436, filed on Apr. 16, 2018.

(51) Int. Cl.
| | |
|---|---|
| *G06F 3/01* | (2006.01) |
| *G02B 27/01* | (2006.01) |
| *G06K 9/00* | (2006.01) |
| *G06K 9/20* | (2006.01) |

(52) U.S. Cl.
CPC .......... *G06F 3/013* (2013.01); *G02B 27/0103* (2013.01); *G02B 27/0172* (2013.01); *G06F 3/012* (2013.01); *G06K 9/00604* (2013.01); *G06K 9/2036* (2013.01); *G02B 2027/014* (2013.01); *G02B 2027/0174* (2013.01); *G02B 2027/0178* (2013.01)

(58) Field of Classification Search
CPC ..... G06F 3/013; G06F 3/012; G02B 27/0172; G02B 27/0103; G02B 2027/0178; G02B 2027/014; G02B 2027/0174; G02B 27/0093; G06K 9/00604; G06K 9/2036; G06K 9/2018
See application file for complete search history.

(56) References Cited

U.S. PATENT DOCUMENTS

| | | | | |
|---|---|---|---|---|
| 8,878,749 | B1* | 11/2014 | Wu | G01S 17/06 345/8 |
| 9,265,415 | B1* | 2/2016 | Starner | G06F 3/012 |
| 9,940,518 | B1* | 4/2018 | Klingstrom | G06T 7/60 |
| 2015/0199008 | A1* | 7/2015 | Kim | G06F 3/013 345/156 |

(Continued)

*Primary Examiner* — Carolyn R Edwards

(57) ABSTRACT

A method of tracking an eye of a user on a wearable heads-up display (WHUD) worn on the head of the user includes generating infrared light over an eye tracking period, scanning the infrared light over the eye, and detecting reflections of the infrared light from the eye. A motion parameter that is sensitive to motion of the WHUD is measured. Eye tracking is performed in a first mode that is based on glint for values of the motion parameter that fall within a first range of motion parameter values for which an error in measurement of glint position. Eye tracking is performed in a second mode that is based on glint-pupil vector for values of the motion parameter that fall within a second range of motion parameter values for which an error in measurement of glint position exceeds the error threshold. A head-mounted apparatus with eye tracking is disclosed.

20 Claims, 17 Drawing Sheets

(56) References Cited

U.S. PATENT DOCUMENTS

2018/0314325 A1* 11/2018 Gibson ................ G02B 27/017
2019/0138093 A1*  5/2019 Ricknas ............. G06K 9/00228
2019/0156100 A1*  5/2019 Rougeaux ............... G06F 3/013
2019/0317597 A1* 10/2019 Aleem .................... G06T 7/246

* cited by examiner

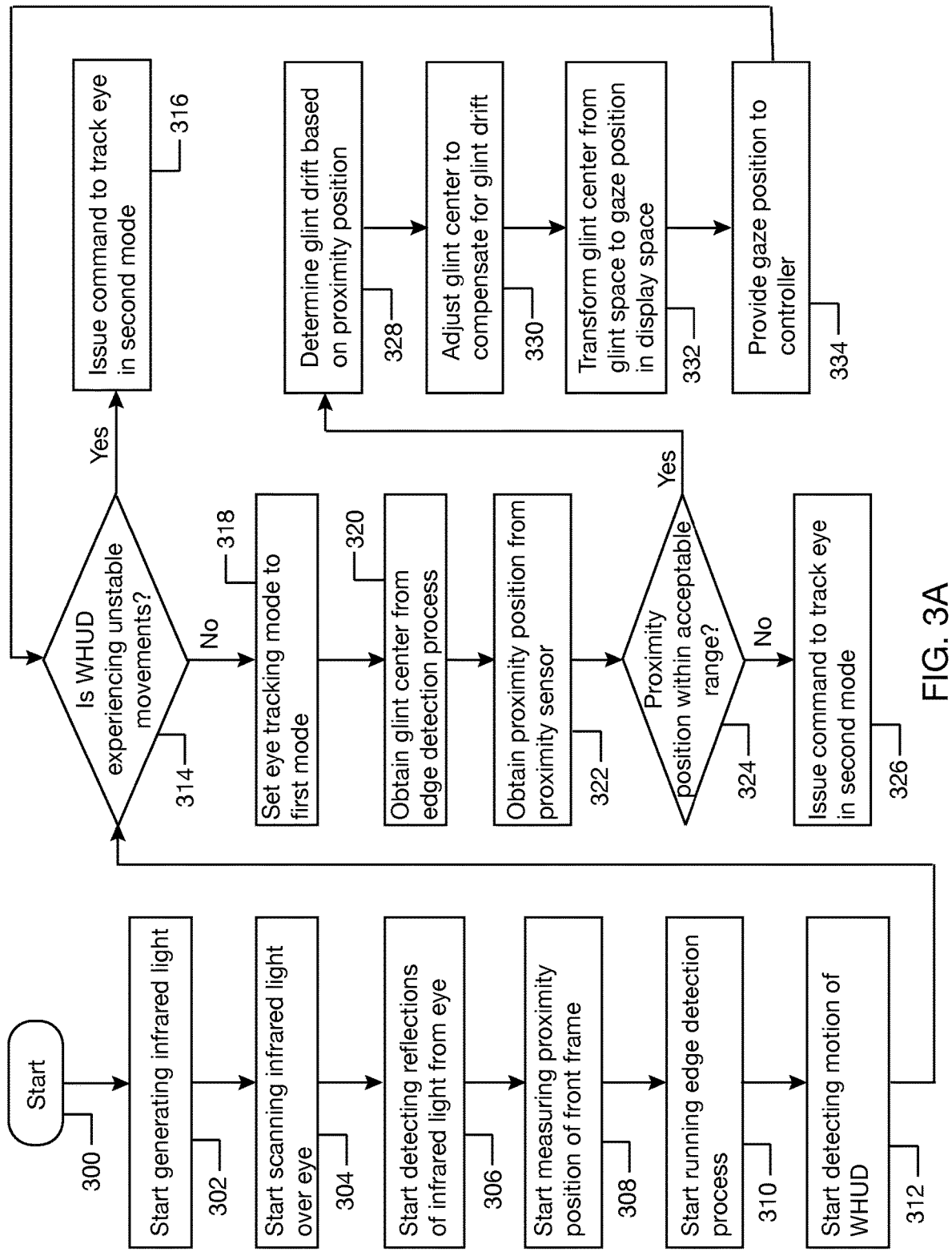

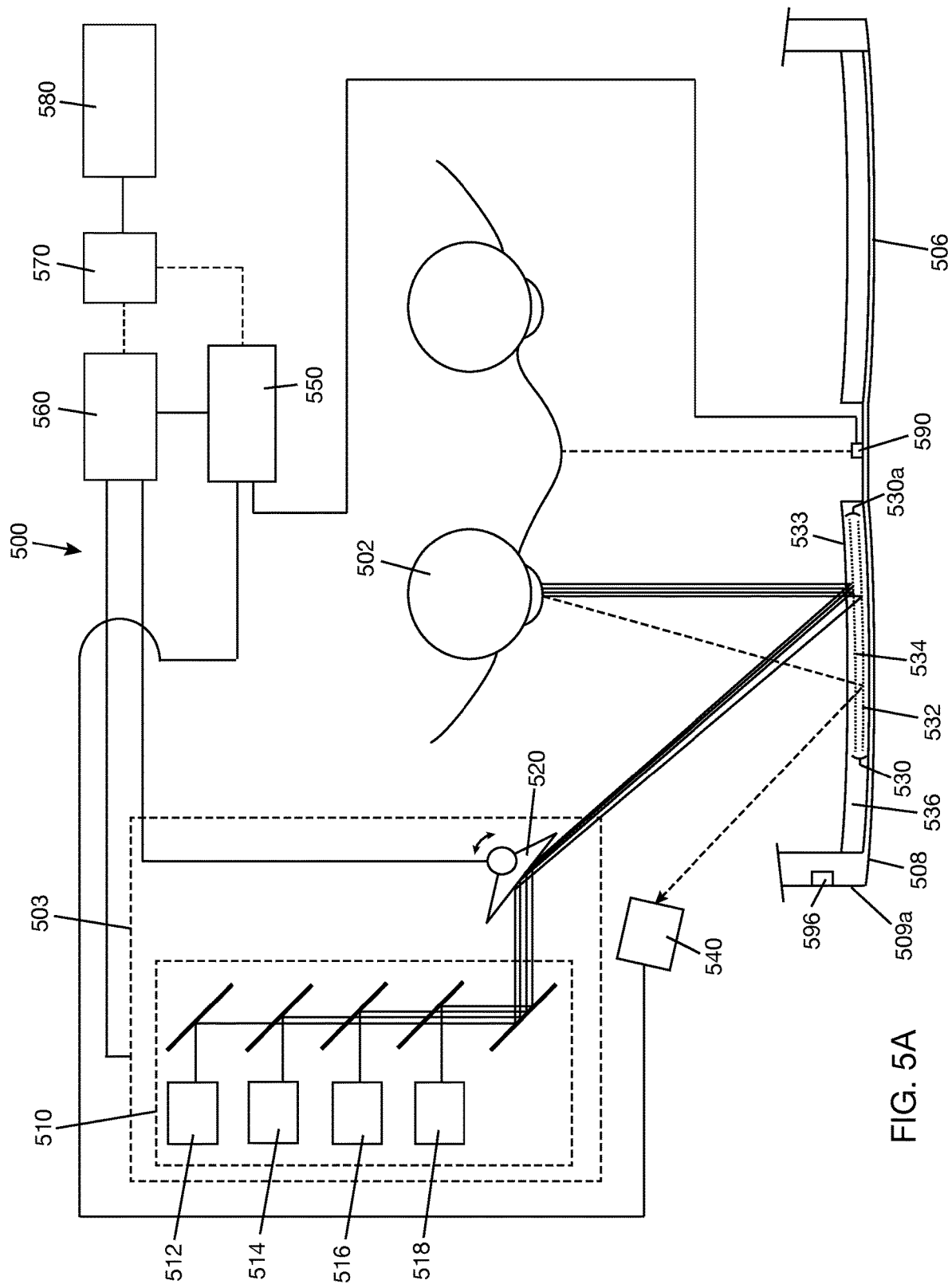

METHOD AND SYSTEM FOR DUAL MODE EYE TRACKING ON WEARABLE HEADS-UP DISPLAY

CROSS-REFERENCE TO RELATED APPLICATIONS

This application claims the benefit of U.S. Provisional Application No. 62/658,436, filed Apr. 16, 2018, titled "Method and System for Eye Tracking in Wearable Heads-Up Display," the content of which is incorporated herein in its entirety by reference.

TECHNICAL FIELD

The disclosure relates to eye tracking on head-mounted electronic devices, such as head-mounted displays.

BACKGROUND

A head-mounted display is a wearable electronic device that can be worn on the head of a user and that positions a display in the field of view of at least one eye of the user when worn. A wearable heads-up display (WHUD) is a head-mounted display that enables the user to see displayed content but does not prevent the user from being able to see the external environment of the user. In general, the display component of a WHUD is at least partially transparent and/or sized and positioned to occupy only a portion of the field of view of the user, allowing the user to see the external environment through and/or around the displayed content.

Eye tracking is a process by which one or more of position, orientation, and motion of an eye may be measured or monitored. In many applications, this is done with a view towards determining the gaze direction of a user. There are various techniques for measuring the position, orientation, and/or motion of the eye, the least invasive of which employs one or more optical sensors, e.g., cameras, to optically track the eye. Common techniques involve illuminating or flooding the eye with infrared light and measuring reflections from the eye with at least one optical sensor that is tuned to be sensitive to the infrared light. Information about how the infrared light is reflected from the eye is analyzed to determine the position, orientation, and/or motion of one or more eye features such as the cornea, pupil, iris, and/or retinal blood vessels.

Eye tracking functionality is attractive in WHUDs for various reasons. Some examples of the utility of eye tracking in WHUDs include influencing where content is displayed in the field of view of the user, conserving power by not displaying content that is outside of the field of view of the user, influencing what content is displayed to the user, determining where the user is looking or gazing, determining whether the user is looking at displayed content on the display or at scenes in the external environment, and providing an interface through which the user may control or interact with displayed content.

One challenge in incorporating eye tracking functionality into a WHUD is how to account for movements of the WHUD and/or head of the user during eye tracking since these motions can lead to errors or inconsistencies in the gaze positions obtained from eye tracking. A small error in gaze position due to WHUD and/or head movement, e.g., an error of 1° on a WHUD having a span of only 10°, can result in an unusable gaze-dependent user interface. For example, if the user intends to focus on a choice on the user interface, the gaze position with the error may indicate that the user is focusing elsewhere on the user interface, or even nowhere on the user interface. There is a need in the art for a WHUD that implements a method and a system of eye tracking that take into account movements of the WHUD and/or head of the user wearing the WHUD during eye tracking.

SUMMARY

A method of tracking an eye of a user on a WHUD worn on a head of the user may be summarized as including (a) generating an infrared light over an eye tracking period, (b) scanning the infrared light over the eye, (c) detecting reflections of the infrared light from the eye, (d) measuring a motion parameter that is sensitive to motion of the WHUD during at least a portion of the eye tracking period, (e) performing an eye tracking operation in a first mode for values of the motion parameter that fall within a first range of motion parameter values for which an error in measurement of glint position does not exceed an error threshold, and (f) performing an eye tracking operation in a second mode for values of the motion parameter that fall within a second range of motion parameter values for which an error in measurement of glint position exceeds the error threshold. Act (e) includes (e.1) identifying at least one glint from at least a portion of the reflections of the infrared light detected during the first mode and (e.2) determining a gaze position of the eye in a display space in a field of view of the eye based on the at least one glint. Act (f) includes (f.1) determining at least one glint-pupil vector from at least a portion of the reflections of the infrared light detected during the second mode and (f.2) determining the gaze position of the eye in the display space based on the at least one glint-pupil vector.

The method may include determining the first range of motion parameter values and the second range of motion parameter values by a learning process.

The method may include selectively adjusting a display content in the display space based on the gaze position.

Act (e.2) may include (e.2.1) determining a glint center position of the at least one glint relative to a glint space, and (e.2.2) transforming the glint center position from the glint space to a gaze position in the display space by a mapping function that transforms glint position coordinates in the glint space to gaze position coordinates in the display space.

The method may include (h) compensating for a drift in the glint center position of the at least one glint relative to the glint space.

Act (h) may include (h.1) estimating the drift in the glint center position of the at least one glint from the motion parameter value corresponding in space to the at least one glint and (h.2) adjusting the glint center position of the at least one glint to compensate for the drift prior to transforming the glint center position from the glint space to the gaze position in the display space.

The method may include (i) detecting proximity positions of the WHUD relative to the head of the user during at least a portion of the eye tracking period. Act (i) may include measuring a proximity position of a front frame of the WHUD relative to a spot on the head of the user using a proximity sensor coupled to the front frame.

Act (h) may include (h.3) determining the drift in the glint center position of the at least one glint relative to the glint space based on a detected proximity position of the WHUD corresponding in space to the at least one glint and (h.4) adjusting the glint center position of the at least one glint to compensate for the drift prior to transforming the glint center position from the glint space to the gaze position in the display space.

The method may include (j) switching the eye tracking operation from the first mode to the second mode in response to at least one detected proximity position of the WHUD that exceeds a proximity position threshold.

Act (e.1) may include (e.1.1) detecting the reflections of the infrared light having an intensity that exceeds an intensity threshold. Act (e.1.1) may include detecting a centroid of rising and falling edges of an intensity profile of at least one reflection having an intensity exceeding the intensity threshold.

Act (f.1) may include (f.1.1) reconstructing an image of the eye from the at least a portion of the reflections of the infrared light detected during the second mode, (f.1.2) detecting a pupil in the image of the eye, (f.1.3) identifying at least one glint corresponding in space to the pupil from the at least a portion of the reflections of the infrared light detected during the second mode, and (f.1.4) determining the at least one glint-pupil vector from the pupil and the at least one glint corresponding in space to the pupil. Act (f.1.3) may include detecting at least one glint in the image of the eye.

Act (b) may include scanning the infrared light over the eye by at least one scan mirror. Act (e.2.1) may include identifying a scan orientation of the at least one scan mirror corresponding in space to the at least one glint and mapping the scan orientation to a position in the glint space.

Act (b) may include scanning the infrared light over an infrared hologram or a hot mirror positioned in a field of view of the eye and redirecting the infrared light towards the eye by the infrared hologram or hot mirror.

Act (c) may include detecting the reflections of the infrared light by at least one photodetector.

Act (d) may include detecting an output signal of a motion sensor coupled to a support frame of the WHUD.

A head-mounted apparatus, e.g., a WHUD, may be summarized as including a support frame that in use is worn on a head of a user; an optical combiner lens carried by the support frame, the optical combiner lens comprising a transparent combiner that is positioned within a field of view of the eye when the support frame is worn on the head of the user; a scanning laser projector carried by the support frame, the scanning laser projector comprising an infrared laser diode to generate infrared light and at least one scan mirror to reflect the infrared light; an infrared detector carried by the support frame; an auxiliary sensor that is sensitive to motion, the auxiliary sensor carried by the support frame; a processor carried by the support frame, the processor communicatively coupled to the scanning laser projector and the infrared detector; and a non-transitory processor-readable storage medium communicatively coupled to the processor. The non-transitory processor readable storage medium stores data and/or processor-executable instructions that, when executed by the processor, cause the apparatus to: generate an infrared light by the infrared laser diode over an eye tracking period; scan the infrared light over at least a portion of the optical combiner lens by the at least one scan mirror and redirect the infrared light from the optical combiner lens to the eye of the user by the transparent combiner; detect reflections of the infrared light from the eye by the infrared detector; measure a motion parameter that is sensitive to motion of the apparatus by the auxiliary sensor; perform an eye tracking operation in a first mode for values of the motion parameter that fall within a first range of motion parameter values for which an error in measurement of glint position does not exceed an error threshold, the eye tracking operation in the first mode including identifying at least one glint from at least a portion of the reflections of the infrared light detected during the first mode and determining a gaze position of the eye in a display space in a field of view of the eye based on the at least one glint; and perform an eye tracking operation in a second mode for values of the motion parameter that fall within a second range of motion parameter values for which the error in measurement of glint position exceeds the error threshold, the eye tracking operation in the second mode including determining at least one glint-pupil vector from at least a portion of the reflections detected during the second mode and determining the gaze position of the eye in the display space based on the at least one glint-pupil vector.

The head-mounted apparatus may include a proximity sensor carried by the support frame. The non-transitory processor-readable storage medium may store data and/or processor-executable instructions that, when executed by the processor, cause the apparatus to: measure a proximity position of the support frame relative to the head of the user by the proximity sensor; determine, by the processor, a drift in a glint center position of the at least one glint based on a measured proximity position of the support frame corresponding in space to the at least one glint; and adjust, by the processor, the glint center position of the at least one glint to compensate for the drift.

The non-transitory processor-readable storage medium may store data and/or processor-executable instructions that, when executed by the processor, cause the apparatus to: determine, by the processor, a drift in a glint center position of the at least one glint based on a value of the motion parameter corresponding in time to the at least one glint; and adjust, by the processor, the glint center position of the at least one glint to compensate for the drift.

The scanning laser projector may include at least one visible laser diode to generate visible light.

The transparent combiner may include a wavelength-multiplexed holographic optical element including at least one infrared hologram that is responsive to the infrared light and unresponsive to the visible light and at least one visible hologram that is responsive to the visible light and unresponsive to the infrared light.

The transparent combiner may include a hot mirror or an infrared hologram that is responsive to the infrared light and unresponsive to the visible light. The transparent combiner may include a lightguide having an input area to receive the visible light generated by the at least one visible laser diode and an output area to output the visible light.

The non-transitory processor-readable storage medium may store data and/or processor-executable instructions that, when executed by the processor, cause the apparatus to adjust a display content in a field of view of the user based on the gaze positions of the eye.

The support frame may have a shape and appearance of eyeglasses.

The foregoing general description and the following detailed description are exemplary of various embodiments of the invention(s) and are intended to provide an overview or framework for understanding the nature of the invention(s) as it is claimed. The accompanying drawings are included to provide further understanding of various embodiments of the invention(s) and are incorporated in and constitute part of this specification. The drawings illustrate various embodiments of the invention(s) and together with the description serve to explain the principles and operation of the invention(s).

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Unless indicated otherwise, the particular shapes of the elements as drawn are not necessarily intended to convey any information regarding the actual shape of the particular elements and have been solely selected for ease of recognition in the drawing.

FIG. 3A is a flow diagram showing a method of tracking eye gaze.

FIG. 5A is a schematic diagram showing a system for displaying content and tracking eye gaze.

FIG. 5C-2 is a cross-sectional view of a lightguide and a hot mirror integrated with an eye side lens and world side lens, with the hot mirror on an outer surface of the eye side lens.

DETAILED DESCRIPTION

Figure 1A:
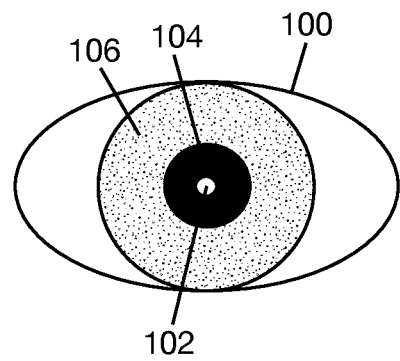
FIGS. 1A-1C are schematic diagrams showing an illuminated eye at different gaze positions.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, the word "comprise" and variations thereof, such as, "comprises" and "comprising" are to be construed in an open, inclusive sense, that is, as "including, but not limited to."

In this disclosure, reference to "one embodiment" or "an embodiment" means that a particular feature, structures, or characteristics may be combined in any suitable manner in one or more embodiments.

In this disclosure, unless the content clearly dictates otherwise, the singular forms "a," "an," and "the" include plural referents. It should also be noted that the term "or" is generally employed in its broadest sense, that is as meaning "and/or" unless the content clearly dictates otherwise.

The headings and Abstract of the disclosure provided herein are for convenience only and do not interpret the scope or meaning of the embodiments In this disclosure, the term "infrared" will be understood to include "near infrared" and will generally refer to a wavelength of light that is larger than the largest wavelength of light that is typically visible to the average human eye. Light that is visible to the average human eye, i.e., "visible light" herein, is generally in the range of 400 nm-700 nm. Thus, as used herein, the term "infrared" refers to a wavelength that is greater than 700 nm, up to 1 mm.

In this disclosure, the term "wearable heads-up display" or "WHUD" refers to an electronic device that can be worn on the head of the user, that secures at least one display within a field of the view of the user when worn on the head of the user, and that enables the user to see displayed content without preventing the user from seeing the external environment of the user. The display is either transparent or semitransparent or at a periphery of the field of view of the user to enable viewing of the displayed content without preventing viewing of the external environment.

In this disclosure, the term "home position," as used with a WHUD, refers to the optimal snug position, or a normal resting position, of a support frame of the WHUD on the head of a given user. The home position is the position of the WHUD on the head of a given user at which content may be displayed within the field of view of the user.

In this disclosure, the term "glint center position" refers to a representative position of a glint relative to an image of an eye. The glint center may be an approximate geometric center of the glint. Glints are typically small compared to the overall eye such that an edge of the glint, or any point within the glint, may be a useful approximation of the center of the glint.

In this disclosure, the term "pupil center position" refers to a representative position of a pupil relative to an image of an eye. The pupil center may be an approximate geometric center of the pupil.

When an eye is illuminated with infrared light (or visible light), specular reflections are generated at different ocular interfaces in the eye. These reflections are commonly referred to as Purkinje images, named after the Czech anatomist and physiologist Johann Purkinje. The first and brightest of the Purkinje images (P1 image) is from the outer surface of the cornea and is known as "glint."

Figure 1B:
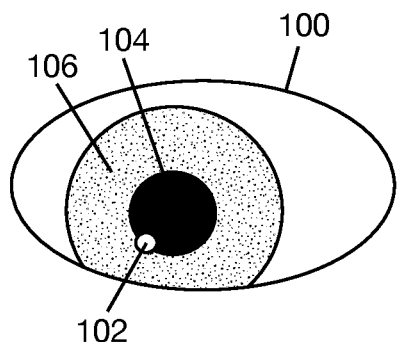
Figure 1C:
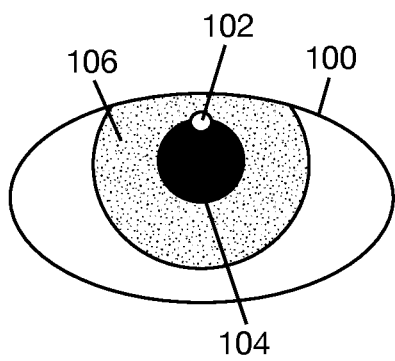
Figure 1D:
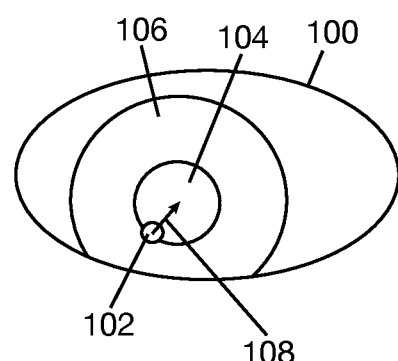
FIGS. 1D-1E are schematic diagrams showing glint-pupil vector on an illuminated eye at different gaze positions.
Figure 1E:
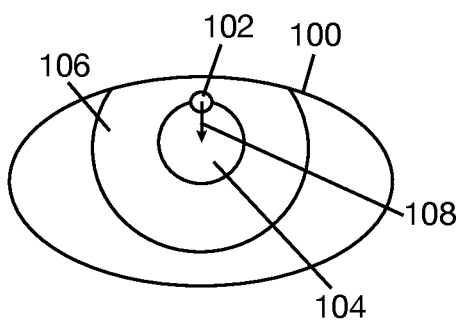

FIGS. 1A-1C illustrate an eye 100 illuminated with infrared light. A glint 102 appears as a bright spot on pupil 104 and/or iris 106 of eye 100. FIGS. 1A-1C show glint 102 at different positions on eye 100 depending on the gaze direction of eye 100. By detecting specular reflections of infrared light from eye 100 over a time period, changes in glint center position can be determined and used to determine changes in gaze position of eye 100 over the time period. When the infrared light used in illuminating the eye is provided by a WHUD, the position of the glint on the eye may also change with movements of the WHUD that are not accompanied by gaze movements. In this case, glint center position may not provide a reliable estimate of the gaze position. Using glint center position as a reference position, a glint-pupil vector joining the glint center and pupil center can be determined. FIGS. 1D and 1E show a glint-pupil vector 108 joining the centers of glint 102 and pupil 104 for different gaze directions of the eye. As illustrated in FIGS. 1D and 1E, glint-pupil vector 108 responds to changes in eye gaze. For some geometries, glint-pupil vector may be less sensitive to movements of the WHUD that are not accompanied by gaze movements. This may allow glint-pupil vector 108 to give a more reliable estimate of the gaze position when glint center position alone may not.

A method of tracking an eye of a user through a WHUD worn on the head of the user includes generating infrared light using select components of the WHUD, e.g., an infrared laser diode, scanning the infrared light over a region of the eye of the user using select components of the WHUD, e.g., an optical scanner and a transparent combiner, and detecting reflections of infrared light from the eye using select components of the WHUD, e.g., an infrared detector. The scanning of infrared light and detection of reflections of infrared light occur over an eye tracking period, which may, or may not, extend over a use period of the WHUD. In one implementation, the method of tracking eye gaze includes an edge detection process that runs generally continuously over the eye tracking period and an image capture process that may run at selected times during the eye tracking period, such as at scheduled times during the eye tracking period and/or in response to an external stimulus, such as, for example, abrupt movements of the WHUD, large displacement of the WHUD from a home position, or a predetermined user interaction with the WHUD.

In one example, the edge detection process includes identifying glints from the output signal of the infrared detector by detecting the specular reflections of infrared light having an intensity that exceeds an intensity threshold. The rising edge, or the falling edge, or the centroid of the rising and falling edges of a specular reflection may be detected. Detecting the centroid of the rising and falling edges of a specular reflection may increase the reliability of the edge detection process in some cases, as will be discussed later. A plurality of glints may be identified from the output signal of the infrared detector over a given eye tracking period. Using scan orientation data from the optical scanner used in scanning the infrared light over the eye, the glint center positions relative to a glint space can be determined.

In one example, the image capture process includes reconstructing an image of the eye from the output signal of the infrared detector. Reconstructing an image of the eye may include obtaining the scan orientation for each detected reflection and mapping detected reflection off the eye to a particular scan orientation. Pupil center position may be obtained from the image of the eye. Glint center may also be obtained from the image of the eye, or from the edge detection process. Using the pupil center and glint center, a glint-pupil vector can be determined.

In one implementation, the edge detection process involves extracting sequential samples from the output signal of the infrared detector at a first sampling rate and identifying the glints from the samples, and the image capture process involves extracting sequential samples from the output signal of the infrared detector at a second sampling rate and reconstructing images of the eye from the samples, where the first sampling rate is higher than the second sampling rate. In a non-limiting example, the first sampling rate may be as high as 100 MHz (i.e., clock frequency), and the second sampling rate may be 5 MHz. With these differential sampling rates, at least one image of the eye is reconstructed from the output signal of the infrared detector over the eye tracking period, whereas a plurality of glints is identified from the output signal of the infrared detector over the same eye tracking period. In general, image reconstruction of the eye from the output signal of the infrared detector is a more computationally intensive process than edge detection of intensity threshold from the output signal of the infrared detector. By allowing the image capture process to run less frequently than the edge detection process, an overall computationally economical eye tracking system that is suitable for mobile gaze aware applications may be achieved.

The infrared detector detects infrared light reflected off the eye and turns the detected reflection into an electrical signal. Whether the signal returning to the infrared detector is a specular reflection or a diffuse reflection, the infrared detector does the same thing, i.e., turns the detected light into an electrical signal. The specular reflection (glint) is a very strong and short duration signal that is easy to detect electrically and act on. The diffuse signal is significantly weaker and takes a different circuit/processing approach to turn into information that can be used to reconstruct the image of the eye. In the edge detection process, the glints are identified from the specular portion of the detected reflections. In the image capture process, the image of the eye is reconstructed from the diffuse portion of the detected reflections.

In one implementation of the method of eye tracking, glints are obtained from a running edge detection process and used for eye tracking. In this case, the glints obtained from the edge detection process are in a glint space that is in the detector domain, whereas the gaze positions used for eye tracking are in a display space that is in the world domain. Thus, a mapping function is used to transform glint position coordinates in the glint space to gaze position coordinates in the display space. The mapping function may be obtained by a first calibration process. The term "first" as used in "first calibration process" has no special meaning beyond keeping track of the calibration processes described in this disclosure. The first calibration process may make use of the previously described edge detection process.

Figure 2A:
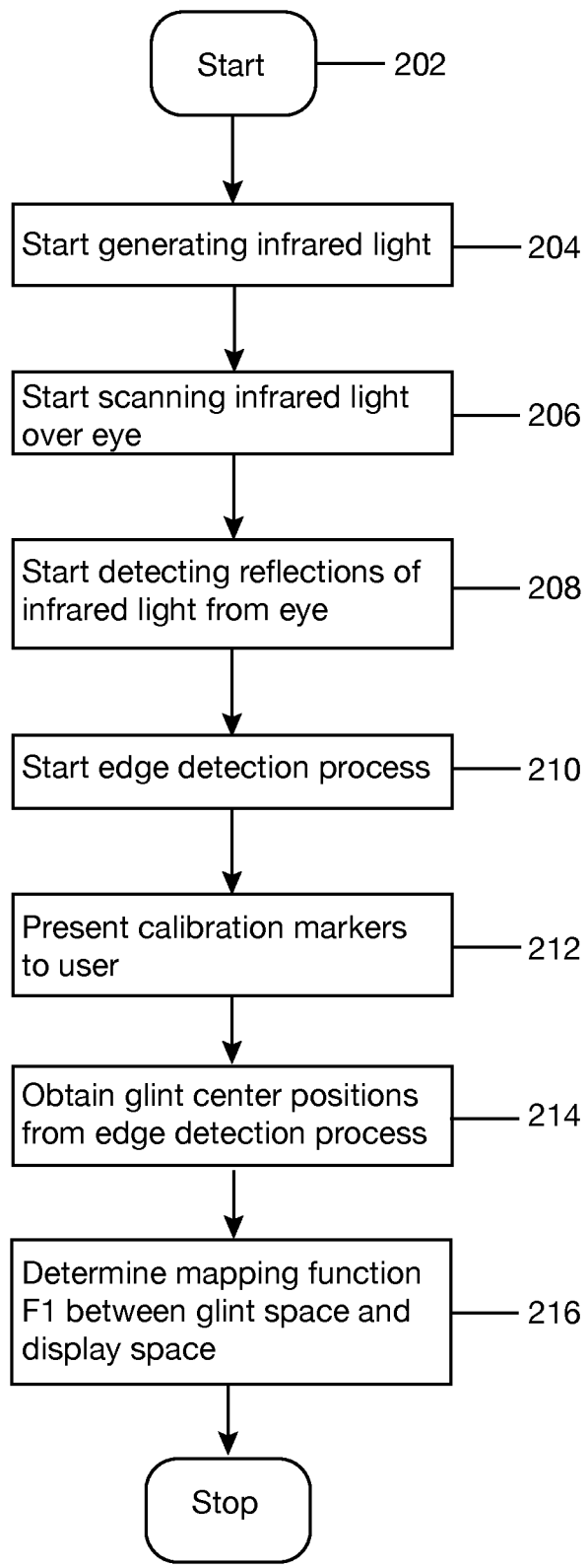
FIG. 2A is a flow diagram showing a first calibration process that determines a mapping function between a glint space and a display space.

FIG. 2A is a flow diagram illustrating one example of the first calibration process. At 202, the first calibration process starts. This may include positioning the WHUD at the home position on the head of the user such that the display space is within a field of view of at least one eye of the user. At 204, generation of infrared light starts, e.g., using an infrared laser diode of the WHUD. At 206, scanning of the eye with infrared light generated at 204 starts, e.g., using an optical scanner of the WHUD. At 208, detection of reflections of infrared light from the eye starts, e.g., using an infrared detector of the WHUD. At 210, an edge detection process starts. At 212, calibration markers are presented at select positions in the display space in a predetermined sequence or pattern to the user, and the user focuses on the calibration markers as they are presented. At 214, glint center positions are obtained from the edge detection process of 210. Thus, for each marker position in the display space, there is a corresponding glint center position in the glint space. At 216, using the marker positions in the display space and the corresponding glint center positions in the glint space, a mapping function F1 is determined between the glint space and the display space. A particular mapping function F1 is not disclosed herein because the mapping function is device- and/or user-dependent. However, mapping function F1 may be determined by, for example, applying geometric transformations, affine transformations, or neural networks to the glint center position and marker position data obtained as described above.

Subsequently, any glint center position within the glint space may be transformed to a gaze position within the display space using mapping function F1.

In one implementation of the method of eye tracking, images of the eye may be obtained from the image capture process. From the images, pupil center positions can be extracted. Pupil center positions together with corresponding glint center positions can be used to compute glint-pupil vectors, which may be used directly or indirectly for eye tracking. The glint center positions corresponding to the pupils extracted from the images of the eye may be obtained from the same images of the eye from which the pupils were extracted or from an edge detection process that is running generally simultaneously with the image capture process. As in the case of the glint space, the glint-pupil vector space is in the detector domain. Thus, a mapping function is used to transform coordinates in the glint-vector space to coordinates in the display space. The mapping function may be obtained by a second calibration process. Again, the term "second" as used in "second calibration process" has no special meaning beyond keeping track of the calibration processes described in this disclosure. The second calibration process may make use of the previously described image capture process and optionally the previously described edge detection process.

Figure 2B:
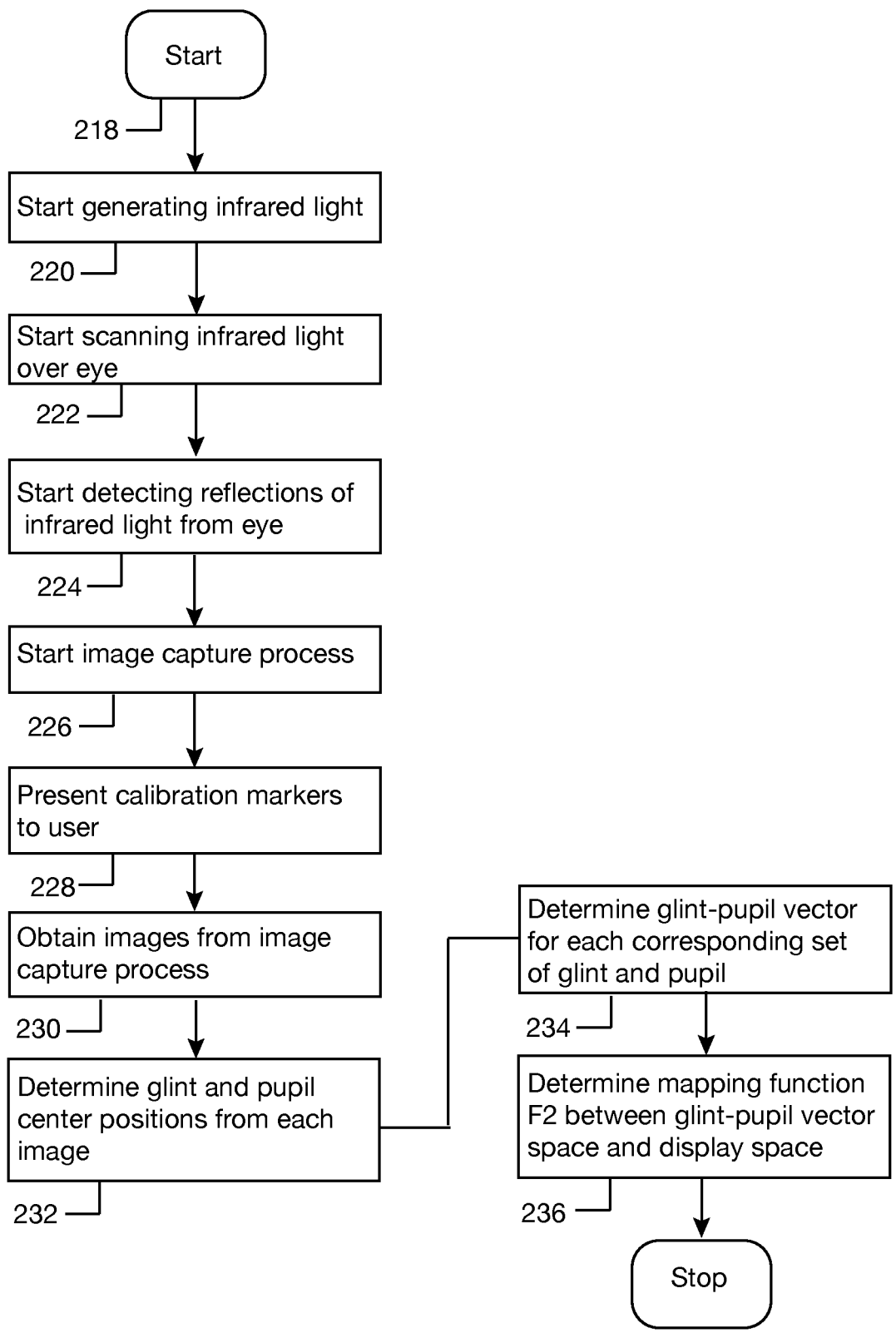
FIG. 2B is a flow diagram showing a second calibration process that determines a mapping function between a glint-pupil vector space and a display space.

FIG. 2B is a flow diagram illustrating one example of the second calibration process. At 218, the second calibration process starts. This may include positioning the WHUD at the home position on the head of the user such that the display space is within a field of view of at least one eye of the user. At 220, generation of infrared light starts, e.g., using an infrared laser diode of the WHUD. At 222, scanning of the eye with infrared light generated at 220 starts, e.g., using an optical scanner and a transparent combiner of the WHUD. At 224, detection of reflection of infrared light from the eye starts, e.g., using an infrared detector of the WHUD. At 226, an image capture process starts. At 228, calibration markers are presented at select positions in the display space in a predetermined sequence or pattern to the user. This may be the same sequence or pattern used in the first calibration process for mapping function F1. The user focuses on the calibration markers as they are presented. At 230, images of the eye are obtained from the image capture process. At 232, from each image, at least one glint and a pupil are extracted, and the glint center position and pupil center position of the glint and pupil, respectively, are determined. (Optionally, if the edge detection process is running, the glint may be obtained from the edge detection process. The glint obtained from the edge detection process should correspond in space to the pupil extracted at 232.) At 234, for each image, a glint-pupil vector is determined from the glint center position and the pupil center position obtained at 232. Thus, for each marker position in the display space, there may be a corresponding glint-pupil vector in the glint-pupil vector space. At 234, using the marker positions in the display space and the corresponding glint-pupil vectors in the glint-pupil vector space, a mapping function F2 is determined between the glint-pupil vector space and the display space. A particular mapping function F2 is not disclosed herein because the mapping function is device- and/or user-dependent. However, mapping function F2 may be determined by, for example, applying geometric transformations, affine transformations, or neural networks to the glint-pupil vector and marker position data obtained as described above. Subsequently, any glint-pupil vector within the glint-pupil vector space may be transformed to a gaze position within the display space using mapping function F2.

The first and second calibration processes may be performed separately as described above. Alternatively, the first and second calibration processes may be combined into a single calibration process. That is, the processes shown in FIGS. 2A and 2B can be combined, without duplication of common sub-processes. For example, in a single calibration process, only one "start generating infrared light" would be used. Edge detection process and image capture process can run generally simultaneously during the single calibration process in which the user focuses on calibration markers presented in a display space. Glint center positions obtained from the edge detection process can be used for determining mapping function F1 as previously described, and images of the eye obtained from the image capture process (and optionally corresponding glint center positions obtained from an edge detection process) can be used to determine glint-pupil vectors, which can be used for determining mapping function F2 as previously described.

In one implementation, the method of eye tracking has two modes of operation: a first mode where eye tracking is by tracking changes in glint center position and a second mode where eye tracking is by tracking changes in glint-pupil vector. In the first mode, at least one glint is obtained from the edge detection process, and the corresponding glint center position is used to determine a gaze position in the display space. In the second mode, at least one image is obtained from an image capture process, a glint-pupil vector is determined from the image, and the glint-pupil vector is used to determine a gaze position in the display space. The first mode may be the default eye tracking mode, and the second mode may be triggered under select conditions, such as when the WHUD is experiencing unstable movements and/or the user has initiated an action that depends on accurate gaze position information. The WHUD may be considered to experience unstable movements when eye tracking based on glint center position alone may be unreliable. This may be the case, for example, if the user is running, causing the WHUD to experience instability on the head of the user. In such a case, glint may be too unstable to be used alone to track the eye gaze.

Figure 2C:
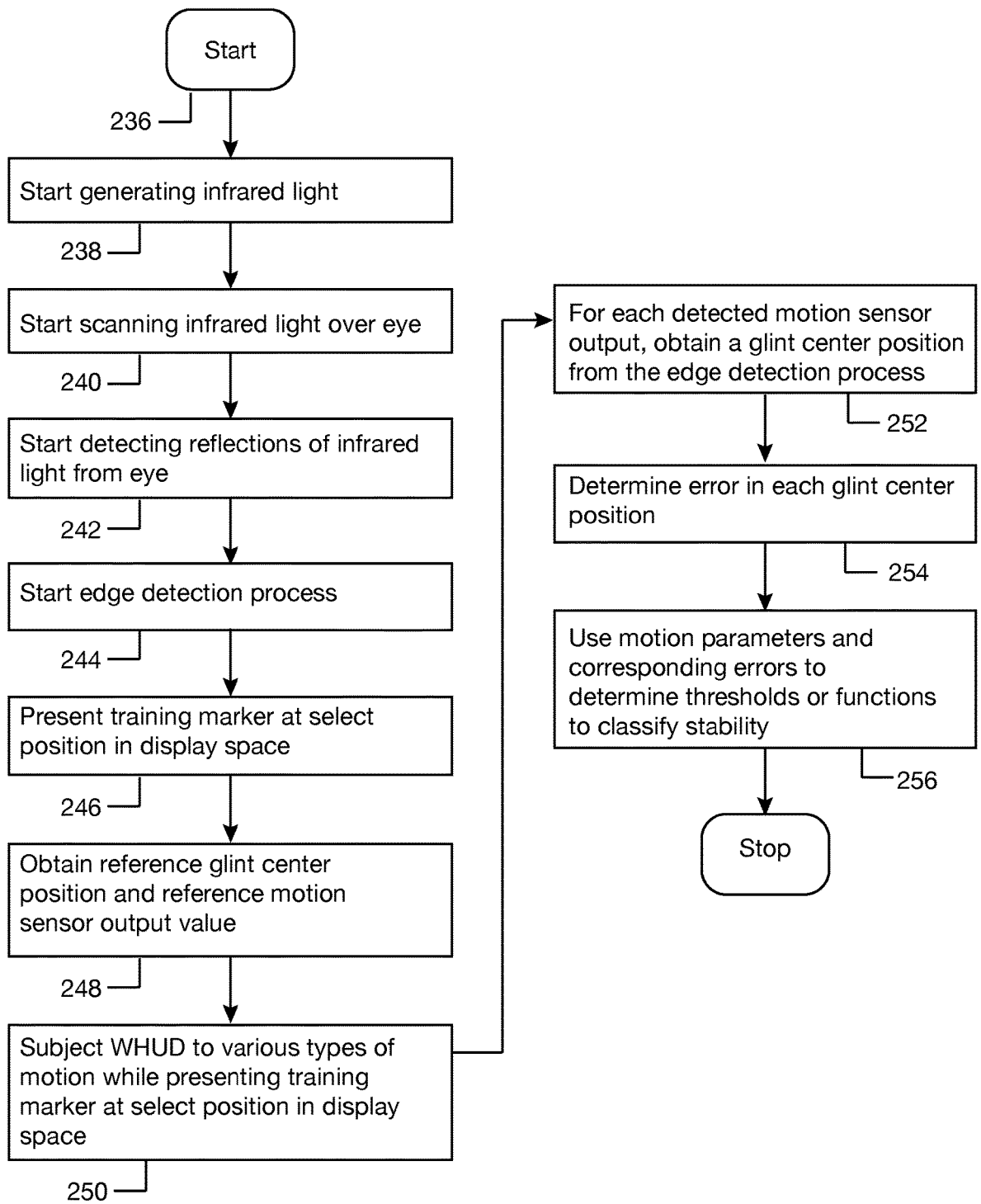
FIG. 2C is a flow diagram showing a learning process that correlates motion of WHUD to glint stability.

What constitutes unstable movements of the WHUD that may lead to triggering of the second mode may be determined by a learning process during manufacturing of the WHUD. FIG. 2C is a flow diagram illustrating one example of a learning process in which a correlation between motion of a WHUD and glint stability may be made. For the learning process, an auxiliary sensor that is sensitive to motion is coupled to a support frame of the WHUD. In one example, the auxiliary sensor is a motion sensor, such as inertial measurement unit, accelerometer, gyroscope, and the like, although other types of sensors that measure a parameter related to motion may be used, e.g., a proximity sensor, a time of flight sensor, and the like. At 236, the learning process starts. This may include placing the WHUD with the motion sensor (or other auxiliary sensor sensitive to motion) at a home position on the head of a training subject such that the display space is within a field of view of at least one eye of the training subject. At 238, generation of infrared light starts, e.g., using an infrared laser diode of the WHUD. At 240, scanning of the eye starts, e.g., using an optical scanner of the WHUD. At 242, detection of reflections of infrared light from the eye starts, e.g., using an infrared detector of the WHUD. At 244, an edge detection process starts, if not already running. At 246, a training marker is presented at a select position in the display space, and the training subject focuses on the training marker. At 248, a glint center position is obtained from the edge detection process. The glint center position obtained at 248 while the WHUD is in the home position may be used as a reference glint center position $GP_r$ in the learning process per training subject. An output of the motion sensor may also be sampled to determine the value $MS_r$ of the motion sensor corresponding to the reference glint center position $GP_r$.

At 250, the WHUD is subjected to various types of motion over a given learning period. For example, learning data would be recorded while one or more training subjects move their head up and down and in circles, jog or run, and/or jump up and down. While the WHUD is subjected to various types of motion, the training marker is displayed at a select position in the display space (this select position should correspond to the position in 246 if the glint center position obtained at 248 is to be used as a reference glint center position), and the training subject focuses on the training marker. At 252, for each detected motion sensor output value $MS_i$, at least one glint is obtained from the edge detection process started at 244. For each glint, a glint center position GPi is determined. Thus, the learning data include $MS_i$, $GP_i$, $MS_r$, and $GP_r$. At 254, for each glint, an error $\delta E$, in glint center position due to motion of the WHUD is determined, e.g., $\delta E_i = GP_i - GP_r$. Thus, for each $MS_i$, there will be a $\delta E_i$. $MS_i$ and $\delta E_i$ data may be collected for several training subjects. At 256, a first range of motion parameter values may be determined from $MS_i$ and $\delta E_i$ data for $\delta E_i$ that does not exceed an error threshold. Also, a second range of motion parameter values may be determined from $MS_i$ and $\delta E_i$ data for $\delta E_i$ that exceeds the error threshold. The error threshold may be based on the allowable eye tracking error for the WHUD. Thresholds or machine learning may be used to determine the first range of motion parameter values and second range of motion parameter values. The first range of motion parameters corresponds to when glint is stable enough that eye tracking in the first mode may be used. The second range of motion parameter values corresponds to when glint may be too unstable such that eye tracking in the second mode should be triggered.

Modifications to the learning process described in FIG. 2C are possible. For example, instead of using one marker position for the learning at 246 and 250, multiple markers at select positions in the display space may be used for learning. Also, instead of obtaining one glint center position for each motion sensor output detected at 252, multiple glint center positions for each motion sensor output detected may be obtained, e.g., if the edge detection process detects glints from multiple reflection paths.

Even in the first mode, i.e., when the WHUD is not experiencing unstable movements that can contribute to glint instability, eye tracking may be prone to shifts in position of the WHUD relative to the head of the user. For example, a shift in the position of the WHUD from the home position may result in a drift in the glint position even when the user has maintained gaze in the display space, i.e., the glint identified from the edge detection process may be in an apparent glint space that is different from the calibrated glint space related to the display space by the mapping function F1.

In one implementation, to improve the robustness of eye tracking in the first mode, the method may include detecting shifts in position of the WHUD relative to the head of the user and estimating glint drift due to the shifts in position of the WHUD during the first mode. The method may further include adjusting the center position of the glint obtained from the edge detection process by an amount indicated by the glint drift prior to mapping the glint center position to a gaze position in the display space using mapping function F1. Alternatively, an offset may be applied to the mapping function F1 based on glint drift such that transforming the glint center position using the mapping function F1 and the applied offset compensates for the glint drift. Adjusting the glint center position by the glint drift, or by applying an offset to mapping function F1 based on glint drift, effectively means moving the glint from some apparent glint space to the calibrated glint space. In one example, detecting shifts in position of the WHUD relative to the head of the user includes placing a proximity sensor on a front frame of the WHUD such that the proximity sensor opposes a spot on the head of the user. The amplitude of the proximity sensor signal may then indicate the proximity of the front frame relative to the head of the user at any given time.

Figure 2D:
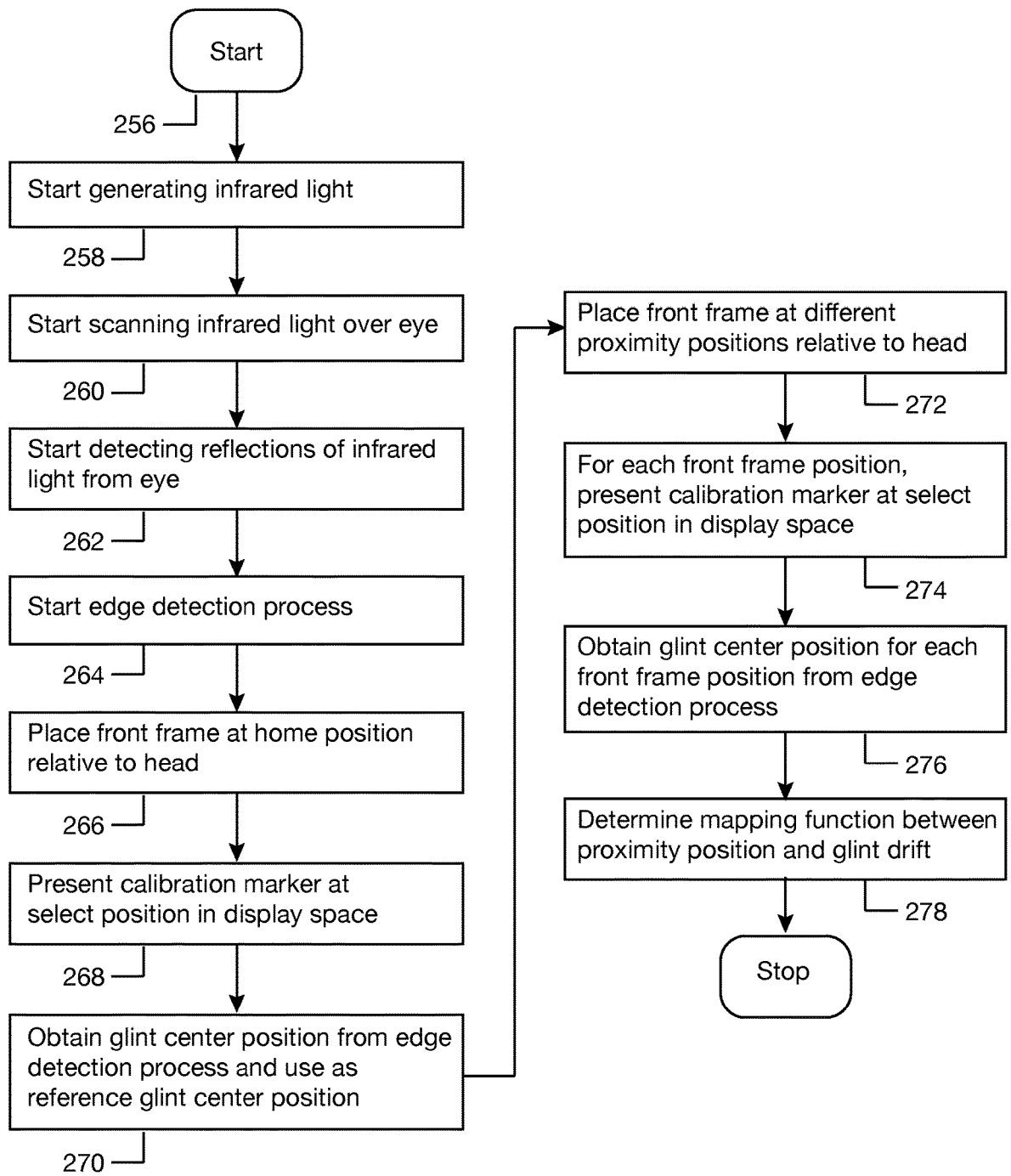
FIG. 2D is a flow diagram showing a third calibration process that determines a mapping function between proximity position and glint drift.

The method may include a third calibration process to determine a mapping function that transforms signals in a proximity sensor space to displacements (glint drift) in the glint space. FIG. 2D is a flow diagram illustrating one example of the third calibration process. At 256, the calibration process starts. This may include positioning the WHUD at the home position on the head of the user such that the display space is within a field of view of at least one eye of the user. At 258, generation of infrared light starts, e.g., using an infrared laser diode of the WHUD. At 260, scanning of the eye starts, e.g., using an optical scanner of the WHUD. At 262, detection of reflections of infrared light from the eye starts, e.g., using an infrared detector of the WHUD. At 264, an edge detection process starts, i.e., if not already running. At 266, a front frame of the WHUD is placed at the home position on the head of the user if not already at the home position. At 268, a calibration marker is presented at a select position in the display space. At 270, a glint center position is obtained from the edge detection process. The glint center position obtained at 270 will be used as a reference glint center position $GP_r$ in the remainder of the calibration process. An output of the proximity sensor may also be sampled to determine the value $PP_r$ of the proximity sensor corresponding to the reference glint center position $GP_r$.

At 272, the WHUD is adjusted a plurality of times over a given calibration period such that the front frame of the WHUD is placed at various positions relative to the head of the user over the given calibration period (for convenience, a computer model of the head or a training subject may be used in lieu of an actual head of the user). Placing the front frame at various positions relative to the head of the user may also include the user moving their head around while wearing the WHUD. At 274, for each position of the front frame, a calibration marker is presented at a select position in the display space (this should be the same marker position used at 268 if the glint center position obtained at 270 is to be used as a reference glint center position). At 276, glint center positions are obtained from the edge detection process. For the marker position, each proximity position $PP_i$ (corresponding to a front frame position) will have a corresponding glint center position $GP_i$. For the marker position, the glint drift $GD_i$ will be the difference between the current glint center position GPi and the reference glint center position $GP_r$. At 278, a mapping function F3 between proximity position $PP_i$ and glint drift $GD_i$ is determined. Mapping function F3 may be determined by, for example, applying linear regression, polynomial regression, other curve fitting functions, or neural networks to the $PP_i$ and $GD_i$ data. Subsequently, any proximity position within the proximity sensor space may be transformed to a glint drift relative to the glint space using mapping function F3.

Modifications to the calibration process described in FIG. 2D are possible. For example, instead of using one marker position for the calibration at 268 and 274, multiple markers at select positions in the display space may be used for calibration. Also, instead of obtaining one glint center position for each proximity position at 276, multiple glint center positions for each proximity position may be obtained, e.g., if the edge detection process detects glints from multiple reflection paths.

In an alternate implementation, glint drift correction in the first mode may be based on motion sensor output. That is, 6E, obtained during the learning process in FIG. 2C, for example, may be considered as a measure of glint drift due to motion of WHUD. For relatively small $\delta E_i$, a mapping function F4 between motion sensor output $MS_i$ and glint drift $\delta E_i$ may be determined by, for example, applying linear regression, polynomial regression, other curve fitting functions, or neural networks to the $MS_i$ and $\delta E_i$ data. During eye tracking in the first mode, mapping function F4 may be used to obtain the glint drift to correct the glint center position.

Figure 2E:
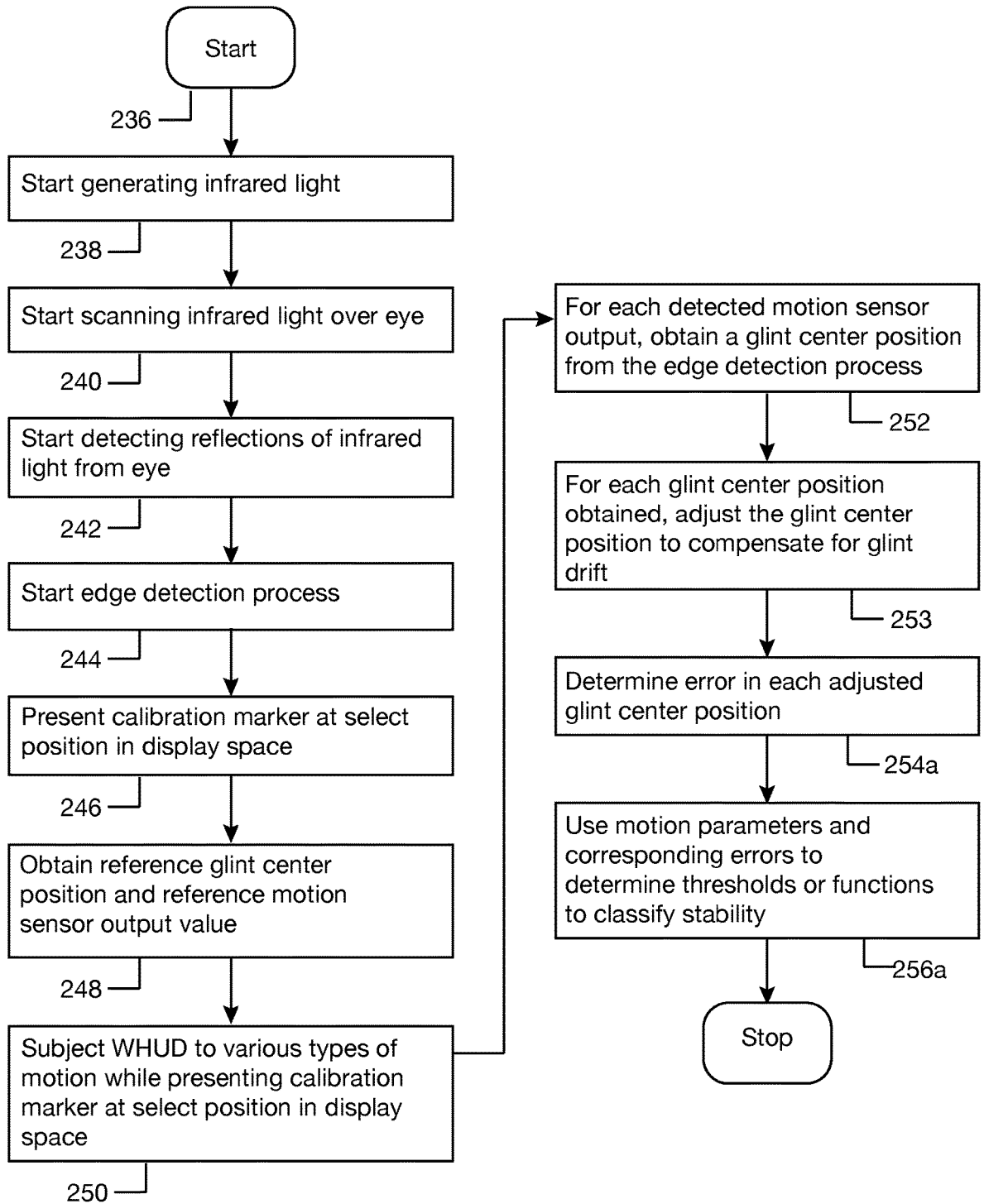
FIG. 2E is a flow diagram showing a learning process that incorporates glint drift correction.

If glint drift correction will be used in the first mode, glint drift correction may be incorporated into the learning process of FIG. 2C so that the second mode is not triggered unnecessarily or too frequently (i.e., is not triggered for errors that can be mitigated by glint drift correction). FIG. 2E illustrates an example of a learning process that incorporates glint drift correction. In the learning process of FIG. 2C, the error $\delta E_i$ in glint center position due to motion of the WHUD is determined from the glint center position $GP_i$ and the reference glint center position $GP_r$. In the modified learning process of FIG. 2E, at 253, each glint center position $GP_i$ is adjusted to compensate for glint drift. The adjustment may be based on a proximity sensor or a motion sensor as described above. At 254a, the error $\delta E_i'$ in glint center position is determined based on the adjusted glint center position $GP_i'$ and the reference glint center position $GP_r$, e.g., $\delta E_i' = GP_i' - GP_r$. At 256a, the first range of motion parameter values and the second range of motion parameter values are based on the $MS_i'$ and $\delta E_i'$ data—this is similar to 256 in FIG. 2C, except that $\delta E_i'$ incorporates glint drift correction. The remainder of FIG. 2E is as previously described for FIG. 2C. For easy reference, the same reference characters have been used for the common features of FIGS. 2C and 2E. A process similar to the third calibration process may be incorporated into the learning process of FIG. 2E to determine the mapping function that would transform proximity sensor output or motion sensor output to glint drift.

The calibration processes and learning process described above are intended to be performed infrequently and may not necessarily precede every eye tracking process. Typically, the calibration processes may be performed when a user first starts using the WHUD or when the WHUD system has been updated or has been reset. In some cases, the proximity position calibration process (third calibration process) may be completed for each particular front frame during the manufacturing process. The learning process may be performed during the manufacturing of the WHUD.

FIG. 3A is a flow diagram illustrating one implementation of the method of tracking an eye of a user. At 300, the eye tracking process starts. If the user is not already wearing a WHUD, the start of the eye tracking process may include the user placing the WHUD on the head. At 302, generation of infrared light starts, e.g., using an infrared laser diode of the WHUD. The infrared light may be generated over an eye tracking period T. Generation of the infrared light may be continuous or periodic or intermittent over the eye tracking period. At 304, scanning of the eye with the infrared light generated at 302 starts, e.g., using an optical scanner and a transparent combiner of the WHUD. Scanning of the eye with infrared light of 304 may be over the eye tracking period T and may generally occur alongside generating the infrared light of 302. At 306, detection of reflections of infrared light from the eye starts, e.g., using an infrared detector of the WHUD. Detection of reflections of infrared light from the eye may be over the eye tracking period T. At 308, measurement of the proximity position of the WHUD relative to the head of the user starts. The measurements may include positioning a proximity sensor on the WHUD in opposing relation to the head of the user. The proximity sensor may be coupled to a front frame of the WHUD such that proximity of the front frame to a spot on the head of the user, e.g., the sellion, is detected. Measurement of the proximity position may be over the eye tracking period T. At 310, an edge detection process, as previously explained, starts. The edge detection process may run generally continuously over the eye tracking period T. A plurality of glints may be identified from the edge detection process over the eye tracking period T. At 312, measurement of a motion parameter of the WHUD by at least one auxiliary sensor coupled to the WHUD starts. In one example, the auxiliary sensor is a motion sensor, e.g., an inertial measurement unit ("IMU"), accelerometer, gyroscope, and the like. In general, the auxiliary sensor may be any sensor whose output may indicate motion, i.e., changes in position and/or orientation, of the WHUD. Examples of motion parameters that may be measured or derived from measurements include, but are not limited to, velocity, acceleration, rotational rate, displacement, pitch, yaw, roll, force, and the like.

At 314, the eye tracking process samples the output of the motion sensor (or other auxiliary sensor that is sensitive to motion of the WHUD) and determines if the WHUD is experiencing unstable movements (e.g., movements or inertial forces outside of one or more defined thresholds or ranges). If the sampled value of the motion sensor output is within the first range of motion parameter values determined during the learning process, the WHUD is considered to not be experiencing unstable movements. On the other hand, if the sampled value of the motion sensor output is within the second range of motion parameter values determined during the learning process, the WHUD is considered to be experiencing unstable movements. If the WHUD is experiencing unstable movements, the eye tracking process issues a command at 316 to track eye gaze in the second mode. After issuing the command, the eye tracking process may return to checking if the WHUD is experiencing unstable movements. If the WHUD is not experiencing unstable movements, the eye tracking process sets the current eye tracking mode to the first mode at 318.

With the eye tracking mode in the first mode, at 320, a glint center position is obtained from the edge detection process (started at 310). At 322 a proximity position is obtained from the output of the proximity sensor. The proximity position obtained from the output of the proximity sensor will correspond in space to the glint center position obtained from the edge detection process. At 324, the eye tracking process determines if the proximity position obtained at 322 is within an acceptable range for which glint drift correction would enable a reliable estimate of gaze position. In one example, a difference between the current proximity position (obtained at a current execution of 322) and the previous proximity position (obtained at a previous execution of 322) is determined. (This generally means that the eye tracking process keeps track of proximity position after each execution of 322. If a previous proximity position does not exist because this is the first execution of 322, the proximity position corresponding to the home position of the WHUD may be used. The proximity position corresponding to the home position of the WHUD may be determined during the third calibration process. If the difference does not exceed a proximity position difference threshold, the current proximity position may be deemed to be within the acceptable range. Otherwise, the current proximity position may be deemed to be outside of the acceptable range. The proximity position difference threshold may be expressed as a percent change in proximity position. For example, if the current proximity position is within p % of the previous proximity position, where p is some real number that is greater than 0, the current proximity position may be considered to be within the acceptable range. The value of p may be determined through calibration.

If the proximity position is not within the acceptable range, the eye tracking process issues a command, at 326, to track the eye gaze in the second mode. After issuing the command, the eye tracking process may return to checking if the WHUD is experiencing unstable movements. If the proximity position is within the acceptable range, the proximity position is transformed to glint drift using mapping function F3 at 328. The glint drift expresses the amount by which the glint center is deemed to have drifted relative to the calibrated glint space. At 330, the glint center position is adjusted by an amount indicated by the glint drift. At 332, the glint center position, which has been compensated for any drift, is transformed from the glint space to a gaze position in the display space using mapping function F1. (Alternatively, adjusting the glint center position at 330 may include determining an offset to apply to mapping function F1 based on glint drift, and transforming the glint center position to a gaze position at 332 may include transforming the glint center position using the mapping function F1 and offset.) At 334, the eye tracking process sends the gaze position to the controller of the WHUD. The controller upon receiving the gaze position may adjust display content in a field of view of the user based on gaze position. Adjustment of display content may include any of modifying the display content, selecting a portion or all of the display content, moving a portion or all of the display content to where the user is looking, and removing a portion or all of the display content, e.g., if the user is not looking at a target area or anywhere within the display space. The eye tracking process returns to 314 to repeat determining if the WHUD is experiencing unstable movements, setting the eye tracking mode to the first mode or second mode, and performing eye tracking in the first mode or second mode. The eye tracking process may run until interrupted, e.g., by the controller of the WHUD or by powering down of the WHUD or by another external stimulus. Each of 314, 316, 318, 320, 322, 324, 326, 328, 330, 332, and 334 may be performed by a processor.

Figure 3B:
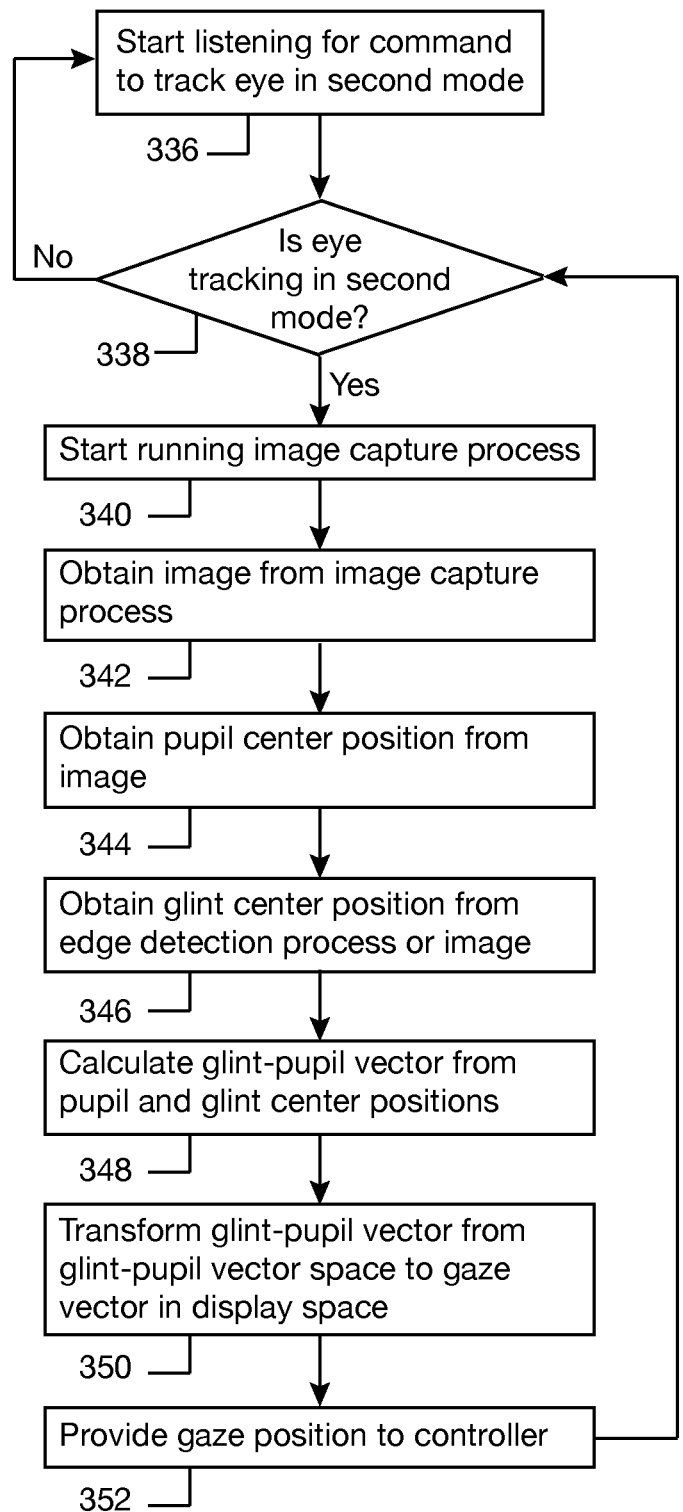
FIG. 3B is a flow diagram showing a method of tracking eye gaze in a second mode.

FIG. 3B is a flow diagram illustrating a process for eye tracking in the second mode. At 336, the eye tracking process starts listening for a command to track the eye gaze in the second mode. Listening for a command to track eye gaze in the second mode may begin as soon as eye tracking starts. The default eye tracking mode when eye tracking starts may be the first mode. The command to start eye tracking in the second mode may come from the controller of the WHUD at select time intervals during the eye tracking period and/or in response to an external stimulus during the eye tracking period, such as, for example, unstable movements of the WHUD or a predetermined user interaction with the WHUD, e.g., if the user initiates an action where accurate gaze position information is critical or desirable. In one example, a command to track eye gaze in the second mode comes after measurement of a motion parameter of the WHUD indicates that the WHUD is experiencing unstable movements (316 in FIG. 3A) or after detection of a proximity position of the WHUD that is not within the acceptable range (326 in FIG. 3A).

Upon receiving a command to track the eye in the second mode, the eye tracking process determines if the eye tracking system is in the second mode at 338. If the eye tracking system is in the second mode, an image capture process, as previously explained, starts at 342. At 344, an image is obtained from the image capture process, and a pupil center position is obtained from the image. At 346, a glint center position is obtained either from the image (the same image used at 344) or from the edge detection process (started at 310 in FIG. 3A). If the glint center position is obtained from the edge detection process, the glint whose glint center position is obtained should correspond in space to the pupil whose pupil center position is obtained from the image of 344. The term "corresponding in space" generally means that the glint and pupil should belong to the same image of the eye or should have been detected at about the same time by the infrared detector. Since the image capture process and edge detection process occur at different sampling rates, down-sampling may be used to obtain the glint center position that corresponds in space to the pupil center position. At 348, the pupil center position of 344 and the glint center position of 346 are used to calculate a glint-pupil vector. At 350, the glint-pupil vector is transformed from the glint-pupil vector space to a gaze position in the display space using mapping function F2 (FIG. 2B). At 352, the eye tracking process provides the gaze position to the controller of the WHUD. The controller may use the gaze position to adjust display content, as previously described with respect to 334 in FIG. 3A. In one implementation, the eye tracking process returns to 338 to continue tracking in the second mode, i.e., until the system switches the eye tracking mode from the second mode to the first mode. The sub-process of determining which mode to run eye tracking in, i.e., 314 in FIG. 3A, and the sub-process of determining gaze position in the second mode, i.e., 340 to 352 in FIG. 3B, may run in parallel such that when it is determined that the WHUD is no longer experiencing unstable movements, the eye tracking mode can be switched from the second mode to the first mode and tracking in the second mode can be terminated.

Figure 3C:
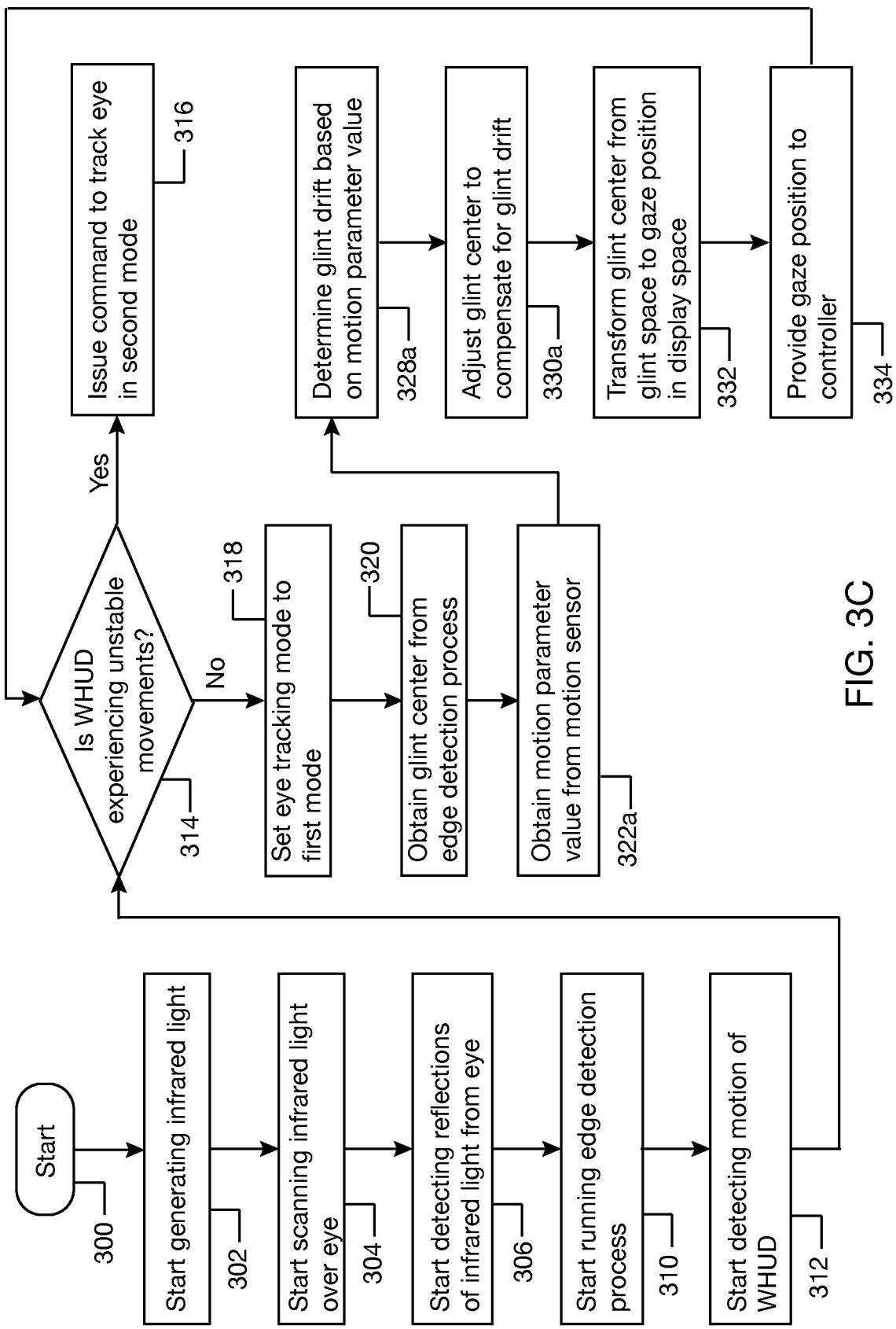
FIG. 3C is a flow diagram showing a method of tracking eye gaze according to another implementation.

FIG. 3C is a modification to the flow diagram shown in FIG. 3A. For convenience, the reference numbers of the parts of FIG. 3C that are common with FIG. 3A have been retained. The modification to the flow diagram of FIG. 3A that is expressed in FIG. 3C is mainly in the process used for glint drift correction. At 318, the eye tracking mode is set to the first mode because the WHUD is not experiencing unstable movements. At 320, a glint is obtained from the edge detection process (started at 310), and the glint center position of the glint is determined. At 322a, a motion parameter value is obtained from the motion sensor. (The same motion parameter value used in determining if the WHUD is experiencing unstable movements at 314 may be used at 322a. In general, the motion parameter value at 322a should correspond in time to the glint whose glint center position was obtained in 320.) At 328a, glint drift is determined based on the motion parameter value, e.g., using the mapping function F4. At 330a, glint center is adjusted to compensate for glint drift. The remainder of the flow diagram, i.e., 332 and 334, are as described with respect to FIG. 3A. Thus, FIG. 3C describes a method that does not rely on detection of proximity positions of a front frame of the WHUD.

Figure 4A:
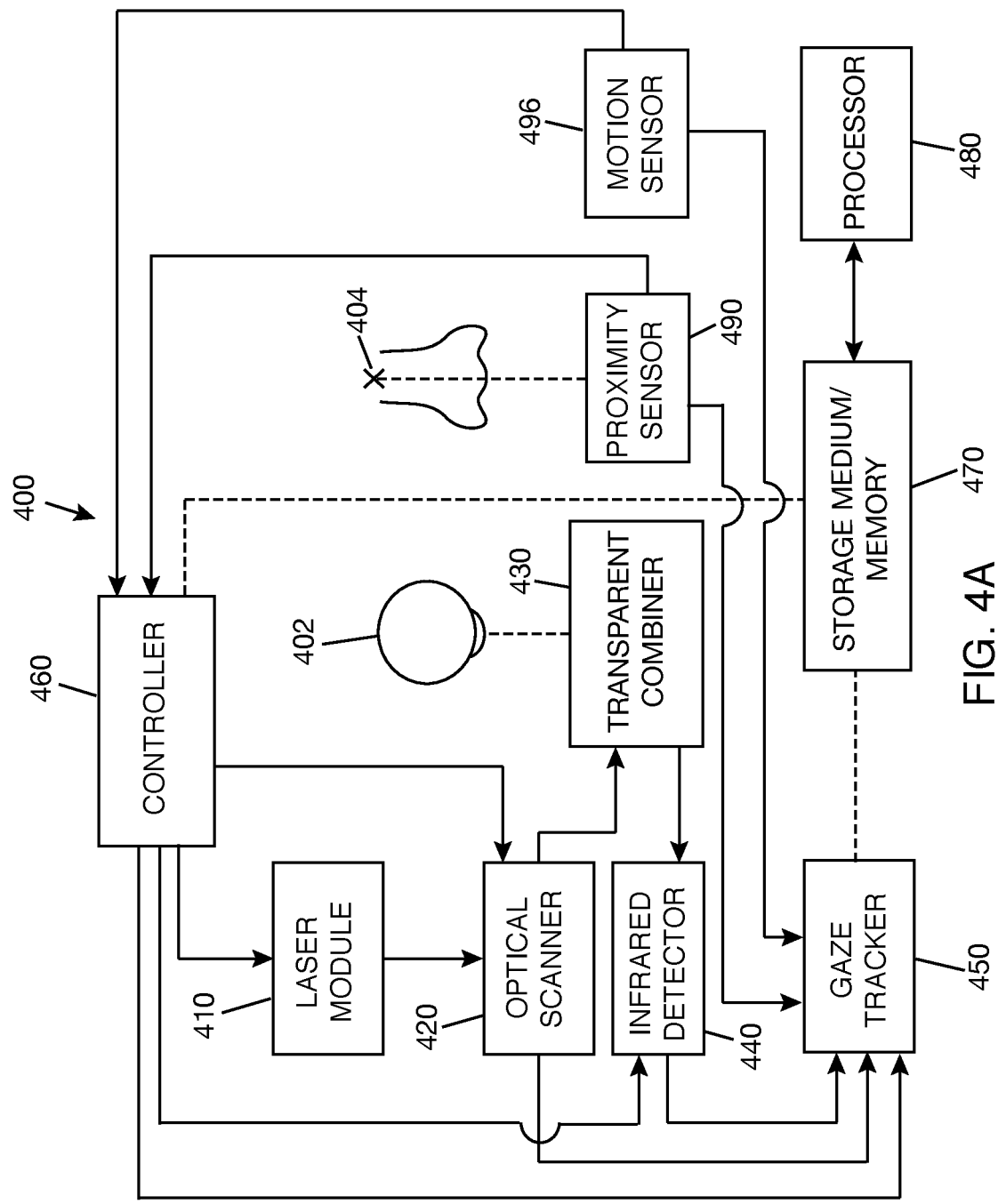
FIG. 4A is a block diagram showing an eye tracking system.
Figure 4B:
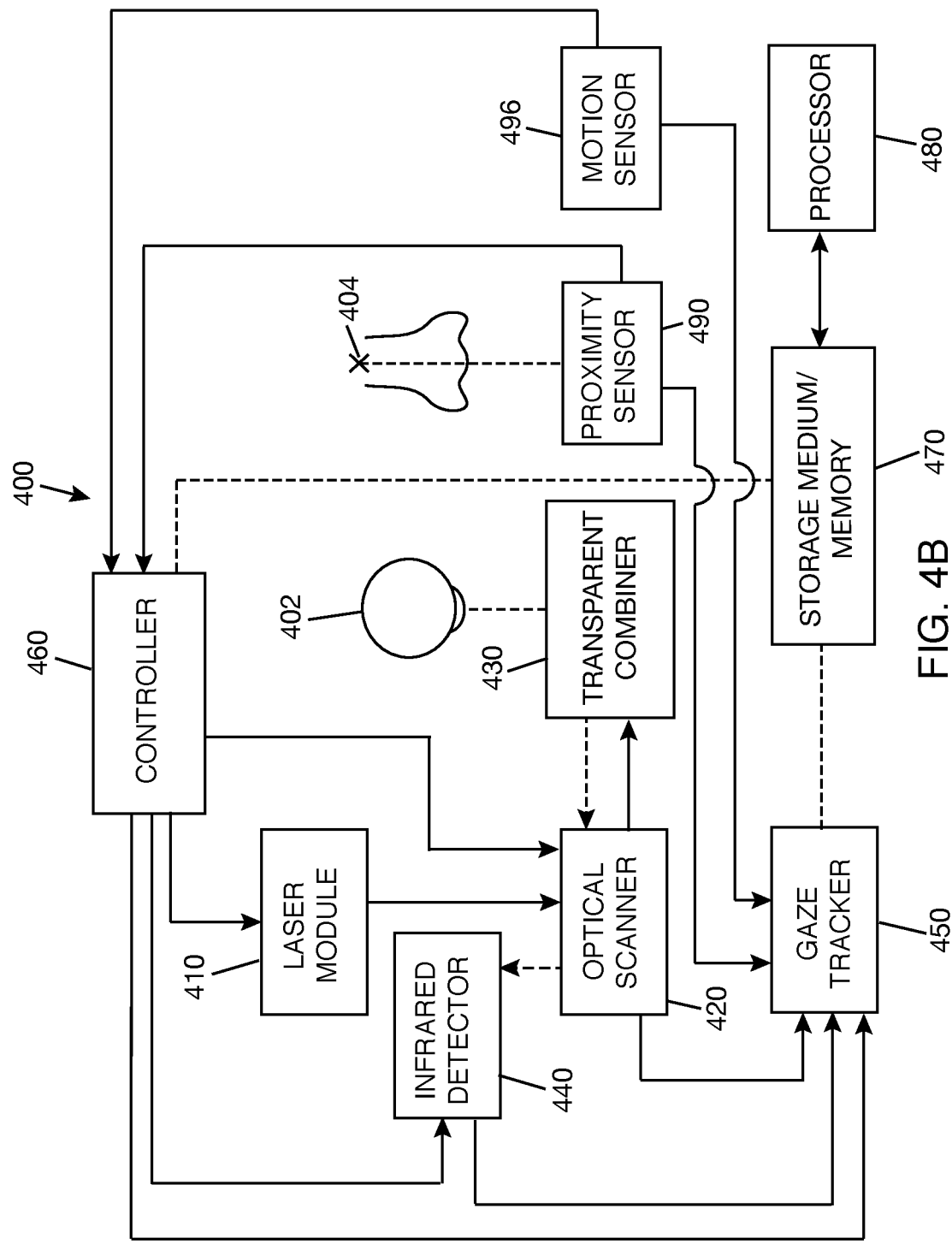
FIG. 4B is a block diagram showing an eye tracking system according to another implementation.

FIG. 4A is a block diagram illustrating an example eye tracking system 400 that may be used in practice of the method described in FIGS. 3A-3C. All of the components of the eye tracking system 400 may be incorporated into a WHUD. Eye tracking system 400 includes a laser module 410 that provides infrared light for eye tracking. Laser module 410 may also provide visible light for content display to the user. Eye tracking system 400 includes an optical scanner 420 that scans infrared light over an eye 402 of the user of the WHUD. Optical scanner 420 may also scan visible light over eye 402. Optical scanner 420 scans a spot of laser light from laser module 410 over a region of eye 402. Eye tracking system 400 may include a transparent combiner 430 that is aligned to receive infrared light from optical scanner 420 and redirect the infrared light to eye 402. The transparent combiner 430 may also receive visible light from optical scanner 420 and redirect the visible light to eye 402. Eye tracking system 400 includes an infrared detector 440 that is aligned to detect reflections of infrared light from eye 402. FIG. 4A shows the infrared light coming off the transparent combiner 430 and going directly to the infrared detector 440. In another implementation, infrared light may come off the transparent combiner 430 and go back through the optical scanner 420, as shown in FIG. 4B by the dashed arrow lines, before being detected by the infrared detector 440.

Returning to FIG. 4A, eye tracking system 400 includes a gaze tracker 450 that determines changes in gaze position of eye 402 over an eye tracking period. Gaze tracker 450 receives input from infrared detector 440, optical scanner 420, and a controller 460. Gaze tracker 450 may receive input from auxiliary sensors, e.g., a proximity sensor 490 and a motion sensor 496. Gaze tracker 450 implements the method described in FIGS. 3A and 3B (or the method described in FIGS. 3B and 3C). Gaze tracker 450 has two modes in which it may track eye gaze. In the first mode, gaze tracker 450 tracks eye gaze using glint center position, as illustrated in FIG. 3A or 3C. In the second mode, gaze tracker 450 tracks eye gaze using glint-pupil vector, as illustrated in FIG. 3B. In one example, gaze tracker 450 switches between the first and second modes based on information from one or both of the motion sensor 496 and the proximity sensor 490 and/or a command from controller 460.

Controller 460 of eye tracking system 400 communicates with laser module 410, optical scanner 420, infrared detector 440, and gaze tracker 450 at least for the purpose of carrying out an eye tracking operation. Controller 460 may also communicate with proximity sensor 490 and motion sensor 496 for the purpose of carrying out an eye tracking operation. Eye tracking system 400 may include non-transitory processor-readable storage medium or memory 470 and one or more processors, e.g., processor 480, to execute processor-executable instructions stored in memory 470. In one example, memory 470 contains processor-executable instructions related to operation of gaze tracker 450. In one example, memory 470 also contains processor-executable instructions related to operation of controller 460. Memory 470 may also contain data from various components of eye tracking system 400 and/or data related to operation of eye tracking system 400.

In one implementation, proximity sensor 490 measures the proximity position of the WHUD relative to the head of the user. For example, proximity sensor 490 may be coupled to a front frame of the WHUD to measure proximity of the front frame relative to a spot 404, e.g., the sellion, on the head of the user. In one implementation, motion sensor 496 measures one or more parameters related to motion of the WHUD. For example, motion sensor 496 may measure velocity, acceleration, rotational rate, displacement, pitch, yaw, roll, force, and the like. Motion sensor 496 may be coupled to a support frame of the WHUD to measure the one or more motion parameters of the WHUD. Controller 460 may receive sensor data from proximity sensor 490 and/or motion sensor 496 and use the sensor data to decide whether the gaze tracker 450 should change the tracking mode or take some other action.

Figure 4C:
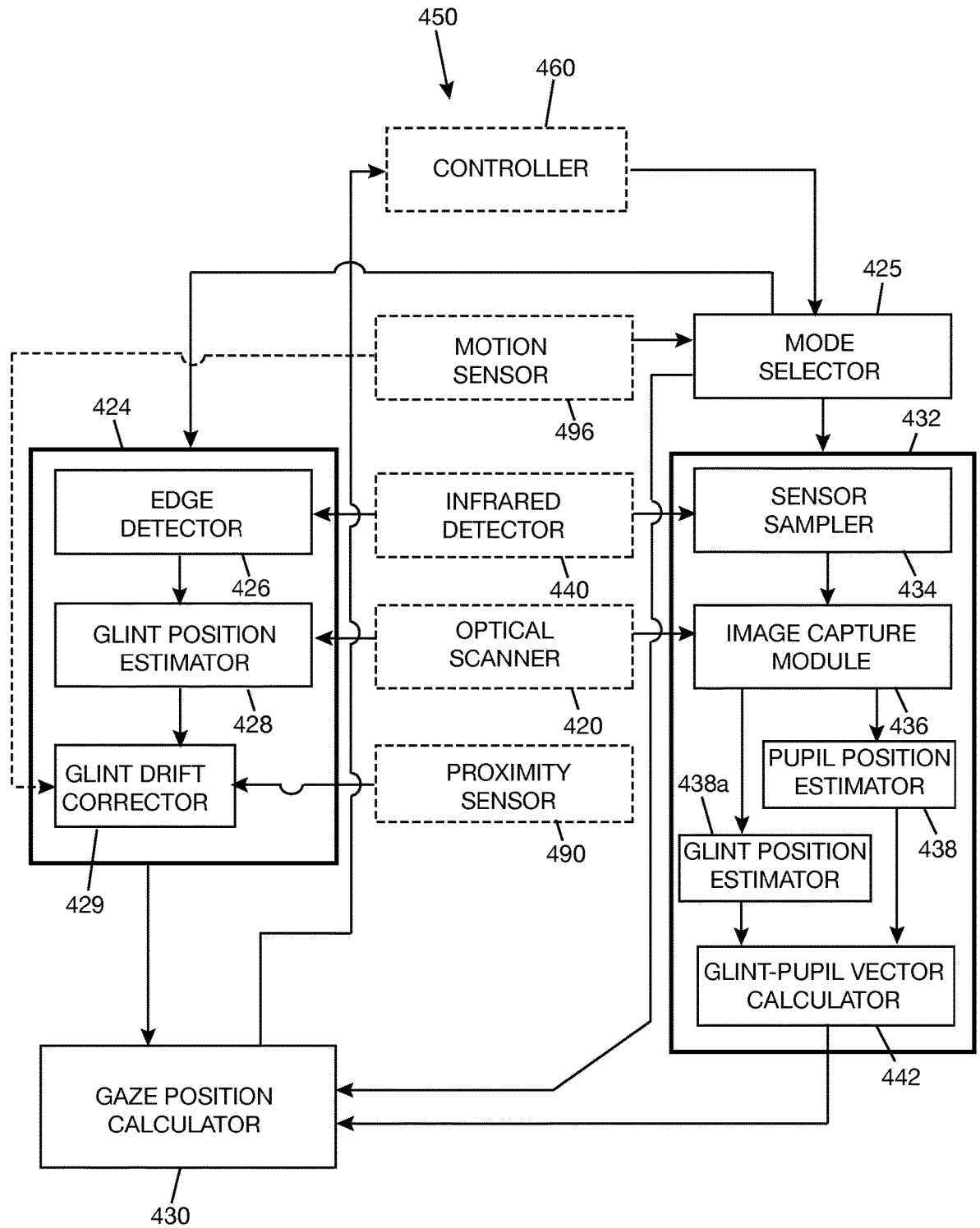
FIG. 4C is a block diagram showing a gaze tracker.

FIG. 4C is a block diagram illustrating components of the gaze tracker 450 according to one example. However, this example is not considered as limiting since there are various ways of configuring the gaze tracker 450 to achieve the eye tracking purposes described above. The components of the gaze tracker 450 may be implemented in any combination of hardware and/or software. In the example of FIG. 4C, gaze tracker 450 includes a glint module 424 that detects glints from an output of infrared detector 440 and computes glint center positions. Gaze tracker 450 includes a glint-pupil vector module 432 that captures images of the eye from the output of infrared detector 440 and computes glint-pupil vectors from the images. Gaze tracker 450 includes a gaze position calculator 430 that selectively communicates with glint module 424 to receive glint center positions and with glint-pupil vector module 432 to receive glint-pupil vectors. Gaze position calculator 430 calculates gaze position using glint center position in the first mode and using glint-pupil vector in the second mode.

Gaze tracker 450 may include a mode selector 425 that sets the current eye tracking mode to one of two modes selected from a first mode where eye tracking is based on glint and a second mode where eye tracking is based on glint-pupil vector. Mode selector 425 may change the current eye tracking mode based on a command from controller 460 or based on an output of the motion sensor 496 and/or proximity sensor 490. Mode selector 425 may communicate the current eye tracking mode to glint module 424, glint-pupil vector module 432, and gaze position calculator 430. If the current eye tracking mode is the first mode, glint module 424 will output a glint center position to gaze position calculator 430, and the gaze position calculator 430 will determine gaze position using, for example, mapping function F1. If the current eye tracking mode is the second mode, glint-pupil vector module 432 will output a glint-pupil vector to gaze position calculator 430, and the gaze position calculator 430 will determine gaze position using, for example, mapping function F2.

In one example, glint module 424 includes an edge detector 426 that detects glints from an output signal of the infrared detector 440 by edge detection and a glint position estimator 328 that determines the glint center position of the detected glints relative to a glint space. Edge detector 426 is communicatively coupled to an output signal of the infrared detector 440 that detects reflections of infrared light from an eye. In one non-limiting example, edge detector 426 is implemented in hardware such that glints are edge-detected by hardware threshold, although this does not preclude implementing the edge detector 426, or parts thereof, in software. Glint module 424 includes a glint position estimator 428 that receives detected glints from edge detector 426. Glint position estimator 428 is also communicatively coupled to optical scanner 420 to receive scan orientation information from optical scanner 420. Scan orientation may be, for example, mirror orientation, if the optical scanner 420 is implemented as at least one scan mirror. Each scan orientation may include position values along two orthogonal axes identifying the coordinate of the at least one scan mirror in the scan orientation space (or mirror orientation space). Glint position estimator 428 uses the glints received from edge detector 426 and the scan orientation information received from the optical scanner 420 to compute glint center positions.

Over an eye tracking period, infrared detector 440 detects reflections from the eye and outputs a signal having an intensity profile that is representative of the detected reflections. In one implementation, edge detector 426 detects when the intensity of the output signal of the infrared detector 440 exceeds an intensity threshold. In one example, the intensity threshold is selected such that reflections from the eye having intensities exceeding the intensity threshold are presumed to come from glints on the eye. From the output signal of the infrared detector 440, edge detector 426 may detect only the rising edge, or only the falling edge, or the centroid of the rising and falling edges of an intensity profile of each reflection having an intensity exceeding the intensity threshold. Tracking the centroid of the rising and falling edges of an intensity profile of a reflection may enable a glint detection process that is less sensitive to shifts in infrared laser wavelength due to drifts in temperature of the infrared laser diode. For instance, as the temperature of the infrared laser diode increases, the wavelength of the infrared light generated by the infrared laser diode will shift, changing the amount of light the transparent combiner (430 in FIG. 4A) redirects towards the eye, which effectively reduces the brightness of the infrared light illuminating the eye (402 in FIG. 4A). If the infrared light brightness is reduced, the centroid of the glint should remain in the same position, but the overall size of the glint radius will be reduced. Therefore, the rising and falling edges will shift closer to the center of the glint. If only the rising edge or the falling edge is tracked, then the glint would appear to have shifted. However, if the centroid of the rising and falling edges is tracked, the glint will remain in the same position, i.e., the glint will not be shifted due to changes in the brightness of the infrared light.

Figure 4D:
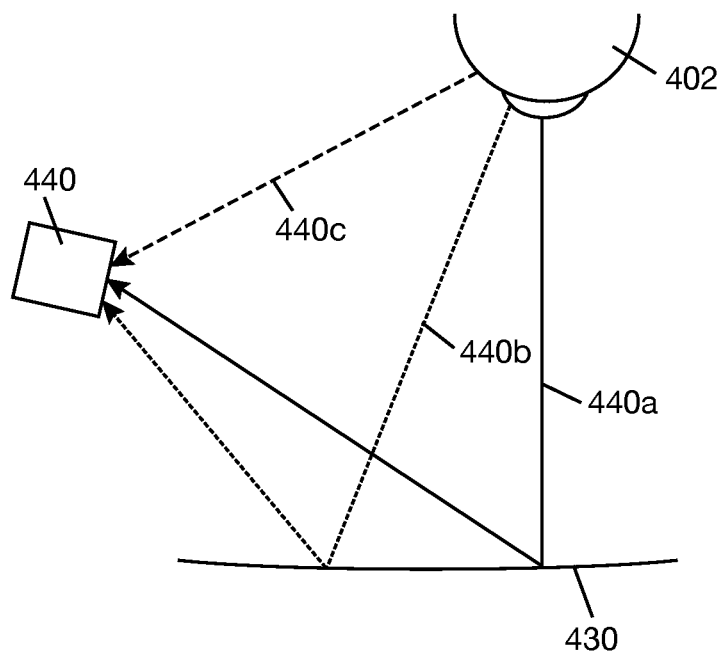
FIG. 4D is a schematic diagram showing detection of reflection of infrared light from eye along multiple paths.

Over the eye tracking period, edge detector 426 outputs sample frames sequentially at a select sampling rate to glint position estimator 428. Each sample frame may correspond to one sweep of infrared light over the eye. Typically, each sample frame will contain at least one glint. In some cases, the sample frame may contain multiple glints from different sources. For example, multiple glints may be detected during a sweep of the infrared light over the eye due to reflections from the eye reaching the infrared detector 440 from multiple directions. FIG. 4D illustrates an example of three paths 440a, 440b, and 440c through which reflection of infrared light from eye 402 may reach infrared detector 440. Each of these reflections may be detected as a glint. Since the reflections reach the infrared detector 440 through different paths, it may be possible to distinguish between the reflections by intensity and/or time of arrival at the detector. The edge detector (426 in FIG. 4C) may select one of the reflections for inclusion in a frame based on intensity and/or time of arrival. Alternatively, the edge detector 426 may include the multiple glints from the different sources (i.e., different reflection paths) in a frame.

If a frame contains multiple glints from different sources, each glint will be in a different region of the glint space compared to the others. To use the multiple glints in eye tracking, a method that combines the gaze position from the multiple glints is used. Examples of methods that combine gaze position from multiple glints are illustrated in FIGS. 4E-4G.

Figure 4E:
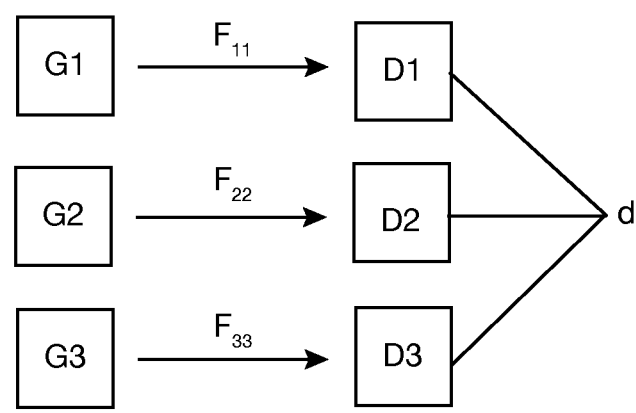
FIG. 4E is a block diagram showing mapping of coordinates from multiple glint spaces to multiple display spaces.

FIG. 4E shows a scheme where mapping functions $F_{11}$, $F_{22}$, $F_{33}$ are determined to transform coordinates in glint spaces G1, G2, G3 to coordinates in display spaces D1, D2, and D3, respectively. The gaze position in the display spaces D1, D2, D3 may be averaged, or otherwise combined, to obtain a final gaze position, d, for eye tracking.

Figure 4F:
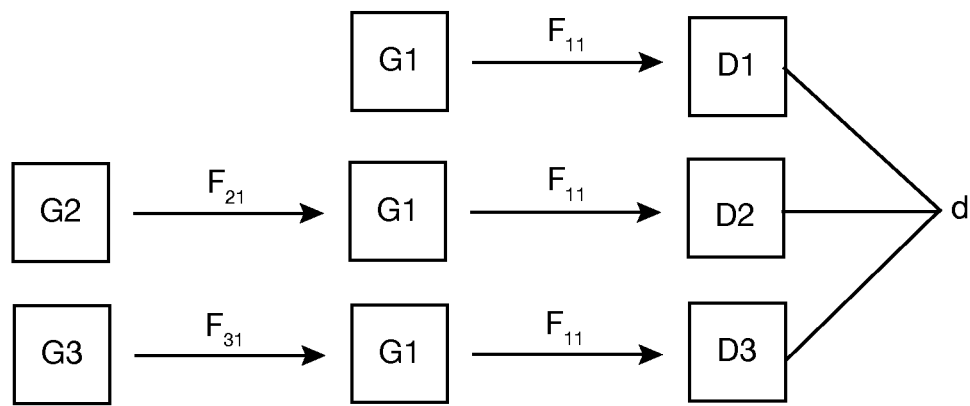
FIG. 4F is a block diagram showing mapping of coordinates between different glint spaces and between multiple glint spaces and multiple display spaces.

FIG. 4F shows an alternate scheme involving glint space to glint space mapping. In FIG. 4F, coordinates in glint space G1 are transformed to coordinates in display space D1 by mapping function $F_{11}$. Coordinates in glint space G2 are transformed to coordinates in glint space G1 by mapping function $F_{21}$ and from glint space G1 to display space D2 by mapping function $F_{11}$. Coordinates in glint space G3 are transformed to coordinates in glint space G1 by mapping function $F_{31}$ and from glint space G1 to coordinates in display space D3 by mapping function $F_{11}$. The gaze position in the display spaces D1, D2, D3 may then be combined to obtain a final gaze position, d, for eye tracking.

Figure 4G:
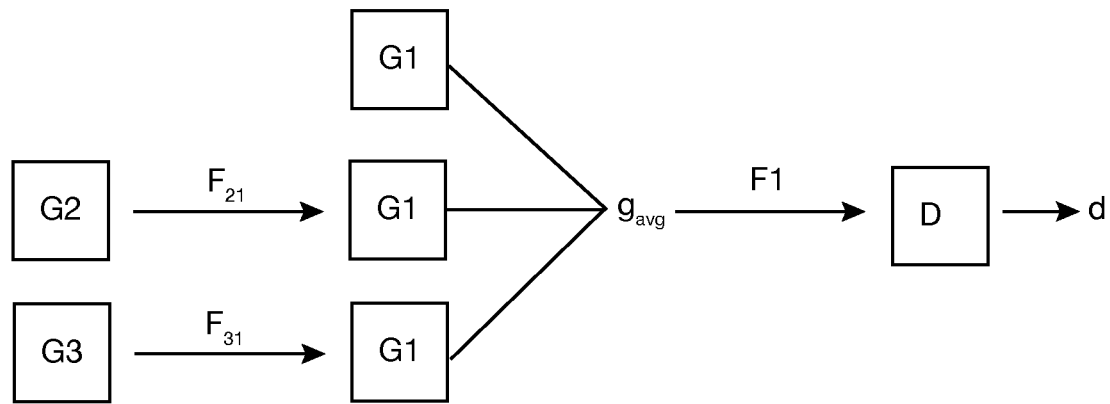
FIG. 4G is a block diagram showing mapping of coordinates between different glint spaces and between a combined glint space and a display space.

FIG. 4G shows another scheme where coordinates in glint space G2 are transformed to coordinates in glint space G1 by mapping function $F_{21}$ and coordinates in glint space G3 are transformed to coordinates in glint space G1 by mapping function $F_{31}$. Glint center positions from the three instances of glint space G1 are combined, e.g., by averaging. The combined glint center position, $g_{avg}$, is transformed to a gaze position, d, in display space D by mapping function $F_1$. Each of the various mapping functions may be determined using a calibration process such as illustrated in FIG. 2A.

Another scheme not shown in the drawings may include nonlinear mapping of the multiple glints to a gaze position in the display space. Machine learning may be used to determine the nonlinear mapping.

Returning to FIG. 4C, glint position estimator 428 receives sample frames from edge detector 426 and scan orientations corresponding to the frames from optical scanner 420. Glint position estimator 428 processes the frames one at a time to identify at least one glint in the frame. Glint position estimator 428 determines the scan orientation corresponding to the glint. Glint position estimator 428 transforms the scan orientation corresponding to the glint from the scan orientation space to the detected reflection space to obtain the glint center position in the glint space. If the frame contains multiple glints, glint position estimator 428 may determine the glint center position for each glint as described above.

In one example, glint module 424 includes a glint drift corrector 429, which compensates for glint drift in the glint center positions determined by glint position estimator 428. In one implementation, glint drift corrector 429 compensates for glint drift due to displacement of the front frame of the WHUD relative to the head of the user. For a given glint drift correction operation, glint drift corrector 429 receives a glint center position from glint position estimator 428. Glint drift corrector 429 also samples the output of the proximity sensor 490 for a proximity position corresponding in space to the glint center position. That is, the proximity position obtained from the output of the proximity sensor 490 would have been measured at about the same time that the glint having the glint center position was detected. Glint drift corrector 429 determines the glint drift based on the proximity position using the mapping function F3. Glint drift corrector 429 then adjusts the glint center position by the amount of the glint drift such that the glint center position is in the calibrated glint space rather than some apparent glint space. In another implementation, glint drift corrector 429 may compensate for glint drift based on measurements made by the motion sensor 496. That is, the glint drift used in adjusting the glint center position is based on a motion parameter value obtained from an output of the motion sensor 496. Mapping function F4 may be used to transform the motion parameter value to glint drift.

In practice, glint module 424 may start operating as soon as infrared detector 440 starts outputting a signal or in response to a command from controller 460. Glint module 424, or parts thereof, such as the edge detector 426, may operate generally continuously over an eye tracking period. Alternatively, glint module 424, or parts thereof, e.g., glint position estimator 428 and glint drift corrector 429, may operate at select time intervals within the eye tracking period.

Gaze position calculator 430 receives glint center positions from glint drift corrector 429. If the current eye tracking mode is the first mode, gaze position calculator 430 transforms each glint center position from the glint space to a gaze position in the display space. Gaze position calculator 430 may receive one glint center position for each frame processed by the glint position estimator 428 and transform the glint center position to a gaze position in the display space using, for example, mapping function F1. Alternatively, gaze position calculator 430 may receive multiple glint center positions for each frame processed by the glint position estimator 428 and transform the multiple glint center positions to a gaze position in the display space using a scheme such as shown in any of FIGS. 4E, 4F, and 4G.

Glint-pupil vector module 432 calculates glint-pupil vector based on the reflections detected by infrared detector 440. The glint-pupil vector may be used by the gaze position calculator 430 to determine gaze position. The glint-pupil vector module 432 may be invoked at scheduled times and/or in response to an external stimulus or command from controller 460. For example, glint-pupil vector module 432 may be activated or invoked when a command to track the eye in the second mode is issued. Glint-pupil vector module 432 may include a sensor sampler 434 that receives samples from the output signal of the infrared detector 440, an image capture module 436 that reconstructs an image of the eye from the samples, a pupil position estimator 438 that determines the pupil center position from the image, a glint position estimator 438*a* that determines the glint center position from the image, and a glint-pupil vector calculator 442 that calculates a glint-pupil vector.

In operation, sensor sampler 434 receives samples from the output signal of infrared detector 440 and outputs sample frames to image capture module 436. Image capture module 436 processes the sample frames one at a time to reconstruct an image of the eye. Each sample frame contains a sequence of samples, where each sample may represent a pixel on the image. Image capture module 436 also receives scan orientations from the optical scanner 420. The scan orientation corresponding to each sample is used to locate the pixel representing the sample on the image. Pupil position estimator 438 receives images from the image capture module 436 and processes each image to identify the pupil in the image. The pupil may be identified using image processing or convolutional neural network techniques. Pupil position estimator 438 determines the center position of each identified pupil. Glint position estimator 438*a* receives images from the image capture module 436 and processes each image to identify the glint in the image. The glint may be identified using image processing or convolutional neural network techniques. Glint position estimator 438*a* determines the center position of each identified glint. (Alternatively, glint position estimator 438*a* may obtain the glint center position from the edge detection process, e.g., from the glint position estimator 428 in the glint module 424).

Glint position estimator 438*a* receives pupil center positions from pupil position estimator 438 and glint center positions from glint position estimator 438*a*. Glint-pupil vector calculator 442 uses each glint center position and pupil center position corresponding in space to determine a glint-pupil vector. In an alternative implementation, glint-pupil vector calculator 442 may receive images directly from the image capture module 436, determine glint and pupil center positions from each image, and compute a glint-pupil vector based on each corresponding glint and pupil center positions. If the current eye tracking mode is the second mode, glint-pupil vector calculator 442 sends the glint-pupil vector to the gaze position calculator 430. When gaze position calculator 430 receives a glint-pupil vector from glint-pupil vector calculator 442, gaze position calculator 430 transforms the glint-pupil vector to gaze position using, for example, mapping function F2. Gaze position calculator 430 may provide the gaze position to controller 460, which may use the gaze position to adjust display content.

FIG. 5A is an illustrative diagram of a system 500 that integrates content display and eye tracking. System 500 includes a scanning laser projector 503 that is operable to scan infrared light and visible light over a target area. In general, the infrared light is used for eye tracking, and the visible light is used for displaying content to the user. Scanning laser projector 503 includes a laser module 510 (corresponding to laser module 410 in FIG. 4A) and optical scanner 520 (corresponding to optical scanner 420 in FIG. 4A). Laser module 510 includes an infrared laser diode 512 to provide infrared light and visible laser diodes 514, 516, and 518 to provide visible light. In general, laser module 510 may have any number and combination of laser diodes to provide infrared light and visible light. In one example, visible laser diodes 514, 516, and 518 provide visible light in different narrow wavebands. In one example, visible laser diodes 514, 516, and 518 are green laser diode, blue laser diode, and red laser diode, respectively. Laser module 510 may include optics to combine the output beams of the multiple laser diodes into a single combined beam. Infrared laser diode 512 may provide a continuous beam of infrared light or may be modulated, e.g., by controller 560 (corresponding to controller 460 in FIG. 4A), to generate a sequence or pattern of infrared light. Similarly, visible laser diodes 514, 516, and 518 may provide a continuous beam of visible light or may be modulated, e.g., by controller 560, to generate a sequence or pattern of visible light.

Optical scanner 520 is positioned, oriented, and operable to receive an illumination spot including infrared light and visible light from laser module 510 and scan the illumination spot across eye 502. In one example, optical scanner 520 may be a scan mirror, hereafter referred to as scan mirror 520. In general, scan mirror 520 is a mirror or reflector capable of scanning light over a surface. In one example, scan mirror 520 may be a two-dimensional scan mirror operable to scan in two directions, for example by oscillating or rotating with respect to two axes. In another example, scan mirror 520 may be two orthogonally-oriented mono-axis mirrors. The mirrors included in scan mirror 520 may be microelectromechanical systems (MEMS) mirrors, piezoelectric mirrors, and the like. In another implementation, scanning laser projector 503 may have more than one scan mirror 520. In another implementation, scanning laser projector 503 may use a mirrorless optical scanner, such as fiber optic scanner, or a combination of mirror and mirrorless optical scanning elements.

Controller 560 may control infrared laser diode 512 and visible laser diodes 514, 516, and 518 to provide a select modulation of infrared light and visible light, respectively, to the scan mirror 520. Depending on the modulation of the infrared laser diode 512 and visible laser diodes 514, 516, and 518, scan mirror 520 may scan each of infrared light and visible light over a substantially continuous surface of eye 402 or may scan each of infrared light and visible light to form an illumination pattern, such as grid pattern, crosshairs pattern, and the like, on the surface of eye 502. Generally, in order for scan mirror 520 to scan each of infrared light and visible light over eye 502, scan mirror 520 may sweep through a range of orientations. For a plurality of orientations of scan mirror 520, scan mirror 520 may receive infrared light from infrared laser diode 512 and visible light from visible laser diodes 514, 516, and 518 and reflect the infrared light and visible light into a respective region of eye 502.

System 500 includes an optical combiner lens 533, which includes a transparent combiner 530 (corresponding to transparent combiner 430 in FIG. 4A) that is aligned to receive infrared light and visible light from scan mirror 520 and redirect the infrared light and visible light to eye 502. In one example, transparent combiner 530 is a wavelength-multiplexed holographic optical element (HOE) 530*a*. Wavelength-multiplexed HOE 530*a* is an optical element that is produced using holographic principles and processes. In one implementation, wavelength-multiplexed HOE 530*a* includes at least one infrared hologram 532 that is responsive to infrared light and unresponsive to visible light and at least one visible hologram 534 that is responsive to visible light and unresponsive to infrared light. "Responsive," herein, means that the hologram redirects at least a portion of the light, where the magnitude of the portion depends on the playback efficiency of the hologram. "Unresponsive," herein, means that the hologram transmits the light, generally without modifying the light. Infrared hologram 532 may be responsive to the entire infrared range or to a subset of the infrared range. Similarly, visible hologram 534 may be responsive to the entire visible range or to a subset of the visible range. In one implementation, the holograms 532, 534 are encoded, carried, embedded in or on, or otherwise generally included in a single volume of holographic material, e.g., photopolymer and/or a silver halide compound. In another example, transparent combiner 530 may be other optical structure besides HOE, such as a light guide or waveguide, although HOE may still be used for the purpose of coupling light into and out of the transparent combiner.

Optical combiner lens 532 includes a transparent lens 536. Transparent combiner 530 (HOE 530*a*) is integrated with transparent lens 536, e.g., by embedding transparent combiner 530 in lens 536 or otherwise attaching transparent combiner 530 to lens 536. Optical combiner lens 533 is coupled to a support frame 506 of the WHUD such that when the WHUD is worn on the head of the user, transparent combiner 530 (HOE 530*a*) is positioned within a field of view of the eye 502. In examples, transparent combiner 530 (HOE 530*a*) is transparent to environmental light.

Figure 5B:
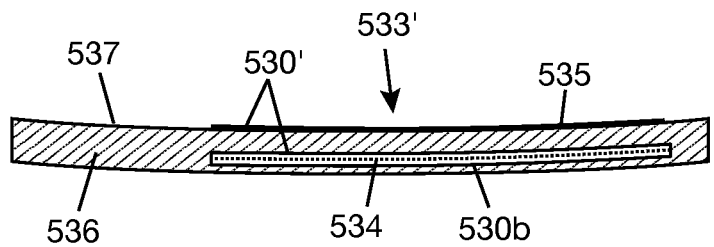
FIG. 5B is a cross-sectional view of a holographic optical element and a hot mirror integrated with a lens.

FIG. 5B shows an alternative optical combiner lens 533' that may be used instead of optical combiner lens 533 in FIG. 5A. Optical combiner lens 533' includes a transparent combiner 530' that is integrated with transparent lens 536. Transparent combiner 530' includes a HOE 530*b* and a hot mirror 535. HOE 530*b* includes at least one visible hologram 534. In some examples, HOE 530*b* may include a visible hologram that is responsible to red light, a visible hologram that is responsive to green light, and a visible hologram that is responsible to blue light. Hot mirror 535 is a dielectric mirror, or a dichroic filter, that reflects infrared light back from a light source while allowing visible light to pass through. Thus, hot mirror 535 may be considered to be responsive to infrared light and unresponsive to visible light. Hot mirror 535 may be transparent in the visible range. Hot mirror 535 is used instead of an infrared hologram (532 in FIG. 5A) to redirect infrared light that is received at optical combiner lens 533' towards the eye. Hot mirror 435 may be a coating or film that is applied on a surface 537 of lens 536. Surface 537 may be on the eye side of lens 536.

Figures 1, 5C:
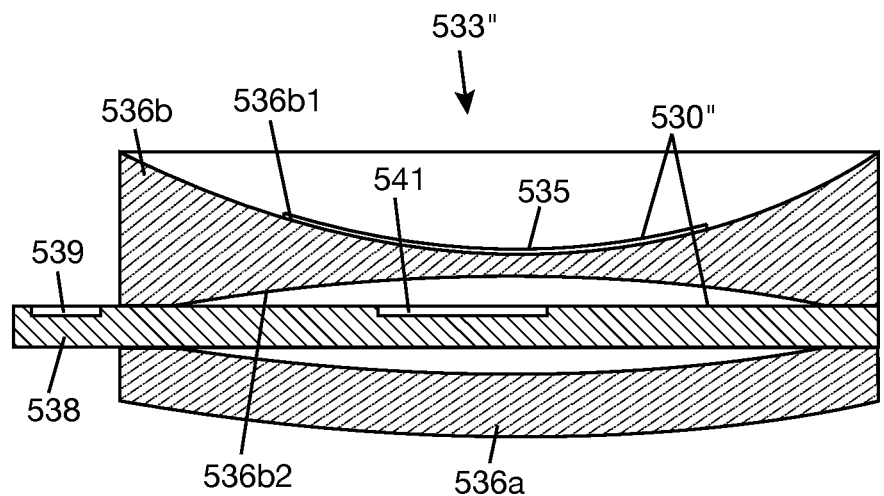
FIG. 5C-1 is a cross-sectional view of a lightguide and a hot mirror integrated with an eye side lens and world side lens, with the hot mirror on an inner surface of the eye side lens.
Figures 2, 5C:
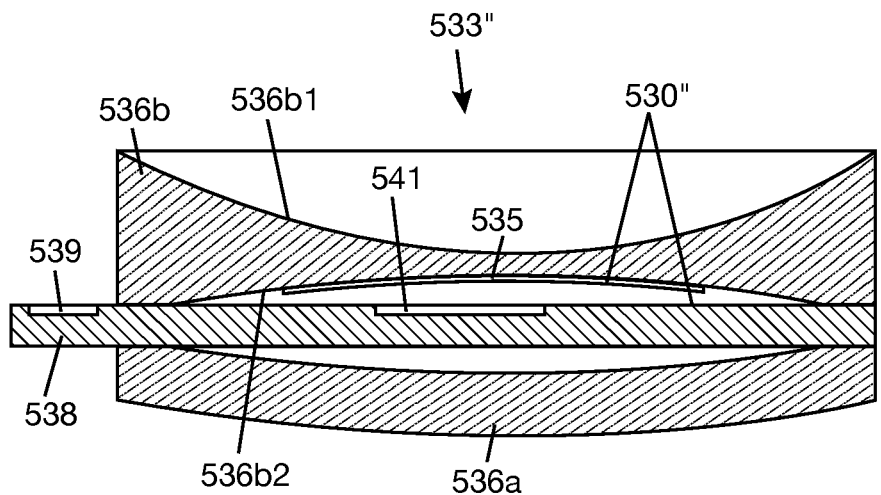

FIG. 5C-1 shows an alternative optical combiner lens 533" that may be used instead of optical combiner lens 533 in FIG. 5A. Optical combiner lens 533" includes an alternative transparent combiner 530" that is integrated with transparent lenses 536*a*, 536*b*. Lens 536*a* may be the world side lens, and lens 536*b* may be the eye side lens. Transparent combiner 530" includes a lightguide 538 disposed between lenses 536*a*, 536*b*. An input coupler 539 may be optically coupled to an input area of the lightguide 538, and an output coupler 541 may be optically coupled to an output area of the lightguide 538. Couplers 539, 541 may be optical gratings, prisms, and the like. Light received into lightguide 538, for example, through input coupler 539, propagates along the length of lightguide 538 by total internal reflection, and exits through output coupler 539 in a direction towards the eye. Transparent combiner 430" may include a hot mirror 535, as described above, to redirect infrared light in a direction towards the eye. Hot mirror 535 may be applied as a coating or film on an outer surface 536*b*1 of lens 536*b*, as shown in FIG. 5C-1, or may be applied as a coating or film on an inner surface 536*b*2 of lens 536*b* as shown in FIG. 5C-2. In other examples, an infrared hologram may be used instead of hot mirror 535 in FIGS. 5C-1 and 5C-2.

When optical combiner lens 533" shown in FIG. 5C-1 or 5C-2 is used in the system 500 of FIG. 5A, the visible light path may be separated from the infrared light path so that the hot mirror 535 (or infrared hologram if used instead of the hot mirror) receives the infrared light and the lightguide 538 receives the visible light. This may require two optical scanners, one for each of the infrared light path and the visible light path. Alternatively, one optical scanner may be used, and the infrared light may be split from the visible light downstream of the optical scanner so that the infrared light is directed to the hot mirror and the visible light is directed to the input area of the lightguide 538.

Returning to FIG. 5A, system 500 includes an infrared detector 540 (corresponding to infrared detector 440 in FIG. 4A) that is positioned, oriented, and operable to detect at least a portion of a reflection of infrared light from eye 502. As used herein, the term "infrared detector" refers to a device that is sensitive to and responsive to infrared light and that provides signals responsive to sensing or detecting infrared light. In one implementation, infrared detector 540 is a single photodiode sensor or photodetector that is responsive to infrared light. In another implementation, infrared detector 540 may be an array of photodetectors that are responsive to infrared light. In yet another implementation, infrared detector 540 may be a complementary metal-oxide semiconductor (CMOS) camera having an array of sensors that are responsive to light in the infrared range. Although FIG. 5A shows only one infrared detector 540, system 500 may have more than one infrared detector positioned, oriented, and operable to detect at least a portion of a reflection of infrared light from eye 502.

Infrared detector 540 may detect reflections of light directly and/or indirectly from eye 502 (see FIG. 4D illustrating an example of multiple paths through which reflection from an illuminated eye 402 may reach infrared detector 440). In one example, infrared detector 540 detects reflections of infrared light from HOE or transparent combiner 530. Reflections of infrared light from eye 502 may also reach infrared detector 540 directly from eye 502. Where infrared detector 540 is generally aligned to detect reflections of infrared light from HOE 530, the reflections that reach infrared detector 540 from eye 502 may be different in intensity and time of arrival compared to the reflections that reach infrared detector 540 from HOE 530 such that it is possible to distinguish where each detected reflection is coming from.

System 500 includes a gaze tracker 550 (corresponding to gaze tracker 450 in FIG. 4A) that determines gaze position of eye 502 based on output of infrared detector 540 and scan orientation of optical scanner 520. Gaze tracker 550, laser module 510, optical scanner 520, and infrared detector 540 may be communicatively coupled to controller 560 (corresponding to controller 460 in FIG. 4A). Controller 560 and gaze tracker 550 may include processor-executable instructions, which may be stored in, for example, non-transitory storage medium or memory 570 (corresponding to storage medium/memory 470 in FIG. 4A). System 500 may include one or more processors, e.g., processor 580 (corresponding to processor 480 in FIG. 4A), for executing instructions on storage medium/memory 570. Since system 500 has a display capability, storage medium/memory 570 may further store data and/or processor-executable instructions that, when executed by processor 580, causes system 500 to project visible display content in the field of view of eye 502. In this case, processor 580 may execute instructions of gaze tracker 550 to determine a region in a field of view of eye 502 of the user at which a gaze of eye 502 is directed.

System 500 includes a proximity sensor 590 (corresponding to proximity sensor 490 in FIG. 4A) that measures a value related to the position of the front frame 508 of the WHUD relative to the head of the user. The term "proximity sensor," as used herein, will be understood to mean any sensor that performs non-contact relative distance detection of an object. The measurements made by the proximity sensor 590 may be used for compensating for glint drift during a portion of eye tracking by glint center position. System 500 may include a motion sensor 596 (corresponding to motion sensor 496 in FIG. 4A), such as an inertial motion unit (IMU), accelerometer, gyroscope, and the like. Motion sensor 596 may be used to detect movements of front frame 508. In the example shown in FIG. 5, motion sensor 596 is coupled to an arm (or temple) 509a of the support frame 506, allowing motion sensor 596 to give an indication of motion of the support frame 506. In general, motion sensor 596 may be mounted anywhere on arms 509a, 509b and front frame 508. Information from motion sensor 596 may be used to determine when to switch the eye tracking system from the first mode, where eye gaze is tracked by glint center position, to the second mode, where eye gaze is tracked by glint-pupil vector.

Figure 6:
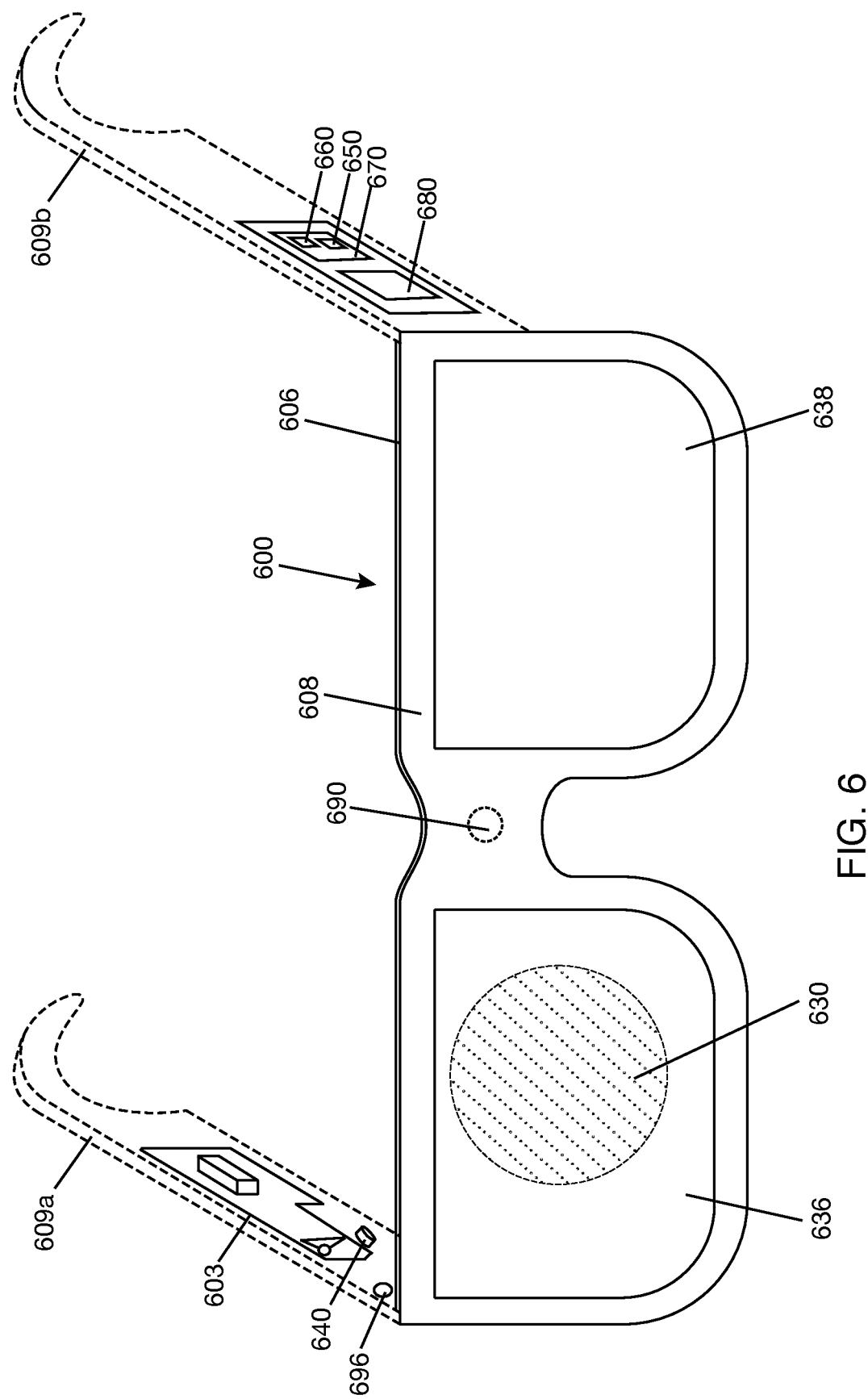
FIG. 6 is a perspective view of a WHUD that may be used for eye tracking and content display.

FIG. 6 illustrates an example WHUD 600 incorporating elements of system 500. In the example of FIG. 6, WHUD 600 has a general shape and appearance of eyeglasses. However, it is possible for WHUD 600 to have other forms, such as a helmet with a visor, goggles, and the like. WHUD 600 has a support frame 606 (corresponding to support frame 506 in FIG. 5) including a front frame 608 (corresponding to front frame 508 in FIG. 5) and a pair of temples (or arms) 609a, 609b. Temples 609a, 609b are coupled to the opposite sides of front frame 608. Front frame 608 supports transparent lenses 636 (corresponding to transparent lens 536 in FIG. 5), 638. A transparent combiner 630 (corresponding to transparent combiner or HOE 530 in FIG. 5) is integrated into one of the lenses, e.g., lens 636. In one example, temple 609a carries a scanning laser projector 603 (corresponding to scanning laser projector 503 in FIG. 5) and an infrared detector 640 (corresponding to infrared detector 540 in FIG. 5). Temple 609b may carry a non-transitory processor-readable storage medium or memory 670 (corresponding to memory 570 in FIG. 5) and one or more processors, e.g., processor 680 (corresponding to processor 580 in FIG. 5). A proximity sensor 690 (corresponding to proximity sensor 590 in FIG. 5) may be coupled to the front frame 608, e.g., the proximity sensor 690 may be mounted on a bridge of front frame 608. A motion sensor 696 (corresponding to motion sensor 596 in FIG. 5) may be coupled to temple 609a or other part of the support frame 606. At least a part of a gaze tracker 650 (corresponding to gaze tracker 550 in FIG. 5) may be stored in memory 670. At least a part of a controller 660 (corresponding to controller 560 in FIG. 5) may be stored in memory 670. Other system components not specifically shown may be coupled as needed to the support frame 606 or may be contained in other components coupled to the support frame 606. Front frame 608 may include communication structures to facilitate transfer of signals between the components mounted on arms 690a, 690b.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of tracking an eye of a user on a wearable heads-up display (WHUD) worn on the head of the user, comprising:
   measuring a motion parameter based on motion of the WHUD during at least a portion of the eye tracking period;
   determining a first range of motion parameter values for which an error in measurement of glint position does not exceed an error threshold;
   performing an eye tracking operation in a first mode for values of the motion parameter that fall within the first range of motion parameter values, wherein performing the eye tracking operation in the first mode comprises identifying at least one glint from at least a portion of reflections of infrared light detected during the first mode and determining a gaze position of the eye in a display space in a field of view of the eye based on the at least one glint
   determining a second range of motion parameter values for which an error in measurement of glint position exceeds the error threshold; and
   performing the eye tracking operation in a second mode for values of the motion parameter that fall within the second range of motion parameter values, wherein performing the eye tracking operation in the second mode comprises determining at least one glint-pupil vector from at least a portion of the reflections of the infrared light detected during the second mode and determining the gaze position of the eye in the display space based on the at least one glint-pupil vector.

2. The method of claim 1, further comprising determining the first range of motion parameter values and the second range of motion parameter values by a learning process.

3. The method of claim 1, further comprising selectively adjusting a display content in the display space based on the gaze position.

4. The method of claim 1, wherein determining a gaze position of the eye in a display space in a field of view of the eye based on the at least one glint comprises:
   determining a glint center position of the at least one glint relative to a glint space; and
   transforming the glint center position from the glint space to a gaze position in the display space by a mapping function that transforms glint position coordinates in the glint space to gaze position coordinates in the display space.

5. The method of claim 4, further comprising compensating for a drift in the glint center position of the at least one glint relative to the glint space.

6. The method of claim 5, wherein compensating for a drift in the glint center position of the at least one glint relative to the glint space comprises:
   estimating the drift in the glint center position of the at least one glint from the motion parameter value corresponding in space to the at least one glint; and
   adjusting the glint center position of the at least one glint to compensate for the drift prior to transforming the glint center position from the glint space to the gaze position in the display space.

7. The method of claim 5, further comprising detecting proximity positions of the WHUD relative to the head of the user during at least a portion of the eye tracking period.

8. The method of claim 7, wherein compensating for a drift in the glint center position of the at least one glint relative to the glint space comprises:
   determining the drift in the glint center position of the at least one glint relative to the glint space based on a detected proximity position of the WHUD corresponding in space to the at least one glint; and
   adjusting the glint center position of the at least one glint to compensate for the drift prior to transforming the glint center position from the glint space to the gaze position in the display space.

9. The method of claim 7, further comprising switching the eye tracking operation from the first mode to the second mode in response to at least one detected proximity position of the WHUD that exceeds a proximity position threshold.

10. The method of claim 4, wherein determining at least one glint-pupil vector from at least a portion of the reflections of the infrared light detected during the second mode comprises:
reconstructing an image of the eye from the at least a portion of the reflections of the infrared light detected during the second mode;
detecting a pupil in the image of the eye;
identifying at least one glint corresponding in space to the pupil from the at least a portion of the reflections of the infrared light detected during the second mode; and
determining the at least one glint-pupil vector from the pupil and the at least one glint corresponding in space to the pupil.

11. The method of claim 4, wherein scanning the infrared light over the eye comprises scanning the infrared light over the eye by at least one scan mirror, and wherein determining a glint center position of the at least one glint relative to a glint space comprises identifying a scan orientation of the at least one mirror corresponding in space to the at least one glint and mapping the scan orientation to a position in the glint space.

12. The method of claim 1, wherein scanning the infrared light over the eye comprises scanning the infrared light over an infrared hologram or a hot mirror positioned in a field of view of the eye and redirecting the infrared light towards the eye by the infrared hologram or hot mirror.

13. The method of claim 1, wherein measuring a motion parameter that is sensitive to motion of the WHUD comprises detecting an output signal of a motion sensor coupled to a support frame of the WHUD.

14. A head-mounted apparatus, comprising:
a support frame that in use is worn on a head of a user;
an optical combiner lens carried by the support frame, the optical combiner lens comprising a transparent combiner that is positioned within a field of view of an eye of the user when the support frame is worn on the head of the user;
a scanning laser projector carried by the support frame, the scanning laser projector comprising an infrared laser diode to generate infrared light and at least one scan mirror to reflect the infrared light;
an infrared detector carried by the support frame;
an auxiliary sensor that is sensitive to motion, the auxiliary sensor carried by the support frame;
a processor carried by the support frame, the processor communicatively coupled to the scanning laser projector and the infrared detector; and
a non-transitory processor-readable storage medium communicatively coupled to the processor, wherein the non-transitory processor readable storage medium stores data and/or processor-executable instructions that, when executed by the processor, cause the apparatus to:
generate an infrared light by the infrared laser diode over an eye tracking period;
scan the infrared light over at least a portion of the optical combiner lens by the at least one scan mirror and redirect the infrared light from the optical combiner lens to the eye of the user by the transparent combiner;
detect reflections of the infrared light from the eye by the infrared detector;
measure a motion parameter based on motion of the apparatus by the auxiliary sensor;
perform an eye tracking operation in a first mode for values of the motion parameter that fall within a first range of motion parameter values for which an error in measurement of glint position does not exceed an error threshold, the eye tracking operation in the first mode including identifying at least one glint from at least a portion of the reflections of the infrared light detected during the first mode and determining a gaze position of the eye in a display space in a field of view of the eye based on the at least one glint; and
perform an eye tracking operation in a second mode for values of the motion parameter that fall within a second range of motion parameter values for which the error in measurement of glint position exceeds the error threshold, the eye tracking operation in the second mode including determining at least one glint-pupil vector from at least a portion of the reflections detected during the second mode and determining the gaze position of the eye in the display space based on the at least one glint-pupil vector.

15. The head-mounted apparatus of claim 14, further comprising a proximity sensor carried by the support frame, wherein the non-transitory processor-readable storage medium stores data and/or processor-executable instructions that, when executed by the processor, cause the apparatus to:
measure a proximity position of the support frame relative to the head of the user by the proximity sensor;
determine, by the processor, a drift in a glint center position of the at least one glint based on a measured proximity position of the support frame corresponding in space to the at least one glint; and
adjust, by the processor, the glint center position of the at least one glint to compensate for the drift.

16. The head-mounted apparatus of claim 14, wherein the scanning laser projector further comprises at least one visible laser diode to generate visible light.

17. The head-mounted apparatus of claim 16, wherein the transparent combiner comprises a wavelength-multiplexed holographic optical element including at least one infrared hologram that is responsive to the infrared light and unresponsive to the visible light and at least one visible hologram that is responsive to the visible light and unresponsive to the infrared light.

18. The head-mounted apparatus of claim 16, wherein the transparent combiner comprises a hot mirror or an infrared hologram that is responsive to the infrared light and unresponsive to the visible light.

19. The head-mounted apparatus of claim 18, wherein the transparent combiner further comprises a lightguide having an input area to receive the visible light generated by the at least one visible laser diode and an output area to output the visible light.

20. The head-mounted apparatus of claim 16, wherein the non-transitory processor-readable storage medium stores data and/or processor-executable instructions that, when executed by the processor, cause the apparatus to adjust a display content in a field of view of the user based on the gaze positions of the eye.

* * * * *